United States Patent
Ganz et al.

(10) Patent No.: US 8,272,951 B2
(45) Date of Patent: Sep. 25, 2012

(54) ATTRIBUTE BUILDING FOR CHARACTERS IN A VIRTUAL ENVIRONMENT

(75) Inventors: Howard Ganz, North York (CA); Karl Joseph Borst, Toronto (CA)

(73) Assignee: Ganz, Woodbridge, Ontario ( * ) Notice: Subject to any disclaimer, the term of this patent is extended or adjusted under 35 U.S.C. 154(b) by 752 days.

(21) Appl. No.: 12/060,649

(22) Filed: Apr. 1, 2008

(65) Prior Publication Data

US 2008/0274805 A1  Nov. 6, 2008

Related U.S. Application Data

(60) Provisional application No. 60/915,499, filed on May 2, 2007, provisional application No. 60/948,846, filed on Jul. 10, 2007, provisional application No. 60/950,039, filed on Jul. 16, 2007.

(51) Int. Cl.
*A63F 9/24* (2006.01)
*A63F 13/00* (2006.01)

(52) U.S. Cl. .............................. 463/29; 463/40

(58) Field of Classification Search .............. 463/29, 463/40
See application file for complete search history.

(56) References Cited

U.S. PATENT DOCUMENTS

| | | | |
|---|---|---|---|
| 4,828,257 A * | 5/1989 | Dyer et al. | 482/5 |
| 4,842,274 A * | 6/1989 | Oosthuizen et al. | 482/5 |
| 5,411,259 A | 5/1995 | Pearson | |
| 5,880,731 A | 3/1999 | Liles et al. | |
| 5,966,526 A | 10/1999 | Yokoi | |
| 6,009,458 A | 12/1999 | Hawkins et al. | |
| 6,031,549 A | 2/2000 | Hayes-Roth | |
| 6,159,101 A | 12/2000 | Simpson | |
| 6,227,966 B1 | 5/2001 | Yokoi | |
| 6,253,167 B1 | 6/2001 | Matsuda | |
| 6,290,566 B1 | 9/2001 | Gabai et al. | |
| 6,404,438 B1 | 6/2002 | Hatlelid | |
| 6,406,370 B1 | 6/2002 | Kumagai | |
| 6,468,155 B1 | 10/2002 | Berlin et al. | |
| 6,522,333 B1 | 2/2003 | Hatlelid | |
| 6,560,511 B1 | 5/2003 | Yokoo et al. | |
| 6,595,858 B1 | 7/2003 | Tajiri et al. | |

(Continued)

FOREIGN PATENT DOCUMENTS

WO   0222224 A1   3/2002

(Continued)

OTHER PUBLICATIONS

Wikipedia, "Eve Online," http://en.wikipedia.org/wiki/Eve_Online.*

(Continued)

*Primary Examiner* — Xuan Thai
*Assistant Examiner* — Michael Grant
(74) *Attorney, Agent, or Firm* — Pearne & Gordon LLP

(57) ABSTRACT

Systems and method provided herein involve a mechanism that allows users to have more input and influence in customizing their virtual characters' profile by developing their attributes. By developing and improving attributes of their characters, the social value of their characters can be increased within the virtual environment. Additional attributes that can be developed include, but are not limited to, strength, speed, agility, intelligence, creativity, style, streetssmart, safety-awareness, grooming, cooking, and manners. Jobs, tasks, classes, sessions, and the like, as well as competitions can be created that emphasize one or more attributes to facilitate encouraging users to have their characters learn, master, and test such new skills.

19 Claims, 28 Drawing Sheets

U.S. PATENT DOCUMENTS

| | | | |
|---|---|---|---|
| 6,609,968 B1 | 8/2003 | Okada et al. | |
| 6,612,501 B1 | 9/2003 | Woll et al. | |
| 6,685,565 B2 | 2/2004 | Tanibuchi et al. | |
| 6,692,360 B2 | 2/2004 | Kusuda et al. | |
| 6,704,784 B2 | 3/2004 | Matsuda et al. | |
| 6,722,973 B2 | 4/2004 | Akaishi | |
| 6,729,884 B1 | 5/2004 | Kelton et al. | |
| 6,758,746 B1 | 7/2004 | Hunter | |
| 6,773,325 B1 | 8/2004 | Mawle et al. | |
| 6,884,163 B2 * | 4/2005 | Namba et al. | 463/1 |
| 6,910,186 B2 | 6/2005 | Kim | |
| 6,918,833 B2 | 7/2005 | Emmerson et al. | |
| 7,025,675 B2 | 4/2006 | Fogel et al. | |
| 7,061,493 B1 | 6/2006 | Cook et al. | |
| 7,066,781 B2 | 6/2006 | Weston | |
| 7,081,033 B1 | 7/2006 | Mawle et al. | |
| 7,089,083 B2 | 8/2006 | Yokoo et al. | |
| 7,171,154 B2 | 1/2007 | Fujisawa | |
| 7,300,344 B2 | 11/2007 | Fujioka et al. | |
| 7,488,231 B2 | 2/2009 | Weston | |
| 2002/0082077 A1 | 6/2002 | Johnson et al. | |
| 2002/0119810 A1 | 8/2002 | Takatsuka | |
| 2002/0160835 A1 | 10/2002 | Fujioka et al. | |
| 2003/0126031 A1 | 7/2003 | Asami | |
| 2004/0043806 A1 | 3/2004 | Kirby et al. | |
| 2004/0053690 A1 | 3/2004 | Fogel et al. | |
| 2004/0093266 A1 | 5/2004 | Dohring | |
| 2004/0143852 A1 | 7/2004 | Meyers | |
| 2004/0219961 A1 | 11/2004 | Ellenby | |
| 2004/0242326 A1 | 12/2004 | Fujisawa et al. | |
| 2005/0059483 A1 * | 3/2005 | Borge | 463/29 |
| 2005/0137015 A1 | 6/2005 | Rogers | |
| 2005/0177428 A1 | 8/2005 | Ganz | |
| 2005/0182693 A1 | 8/2005 | Alivandi | |
| 2005/0250415 A1 | 11/2005 | Barthold | |
| 2005/0250416 A1 | 11/2005 | Barthold | |
| 2005/0287925 A1 | 12/2005 | Proch et al. | |
| 2006/0082068 A1 | 4/2006 | Patchen | |
| 2006/0100018 A1 | 5/2006 | Ganz | |
| 2007/0082720 A1 | 4/2007 | Bradbury et al. | |
| 2007/0087838 A1 | 4/2007 | Bradbury et al. | |
| 2007/0087839 A1 | 4/2007 | Bradbury et al. | |
| 2007/0174304 A1 | 7/2007 | Shrufi et al. | |
| 2008/0163055 A1 | 7/2008 | Ganz et al. | |
| 2008/0280684 A1 | 11/2008 | McBride et al. | |
| 2009/0203446 A1 | 8/2009 | Bradbury et al. | |

FOREIGN PATENT DOCUMENTS

| | | |
|---|---|---|
| WO | 0227591 A1 | 4/2002 |
| WO | 02/054327 A1 | 7/2002 |

OTHER PUBLICATIONS

EVElopedia, "Skill Training," http://wiki.eveonline.com/en/wiki/Skill_training.*

MD Weems, "Getting Experience, Leveling, and Training in Woirld [sic] of Warcraft—new Player Guide for WoW," http://www.brighthub.com/video-games/pc/articles/10786.aspx, Oct. 12, 2008.*

Rick Barba, "The Sims Livin' Large Expansion Pack, Prima's Official Strategy Guide," copyright 2000, pp. 102-103.*

World of Warcraft Manual, 2004.*

World of Warcraft Daily Quests (May 25, 2007 (Wayback Machine), www.wowwiki.com/daily_quest).*

Grace, "Web Site Tycoon's Next Goal: Sixth Grade"; Woonsocket Call, Jun. 19, 2002.

http://web.archive.org.web.20031202190119/www.monopets.com/, Dec. 2, 2003.

Blizzard Entertainment, Diablo Game Manual, Dec. 1996, pp. 10-20, 28-29.

Blizzard Entertainment, Diablo II Game Manual, Jun. 29, 2000, pp. 28-31, 44-69.

"The Sims Booklet," dated 2000.

Neopian Hospital, retrieved Mar. 24, 2010.

Neopets—Archeology, retrieved Mar. 25, 2010.

The Helpful Neopian, retrieved Mar. 25, 2010.

Examination Report—AU2008201961—Jan. 22, 2010.

Wikipedia, "Eve Online," http://en.wikipedia.org/wiki/Eve_Online. Last accessed Feb. 2011.

EVElopedia, "Skill Training," http://wiki.eveonline.com/en/wiki/SkilUraining. Last accessed Feb. 2011.

MD Weems, "Getting Experience, Leveling, and Training in Woirld [sic] of Warcraft—new Player Guide for WoW," http://www.brighthub.com/video-games/pc/articles/1 0786.aspx, Oct. 12, 2008.

* cited by examiner

| My Resume | | | |
|---|---|---|---|
| Job Title | Level | Successes | Attempts |
| W Shop Bag Boy | 1 | 1 | |
| Shoe Store Clerk | 0 | 2 | |
| Fence Painter | 2 | 0 | 1 |
| Dr. Quack's Assistant | 3 | 6 | |
| Florist | 3 | 8 | 3 |
| KinzCash Earned | From last job: =W=50 | Total: =W=200 | |

FIG. 3

ATTRIBUTE BUILDING FOR CHARACTERS IN A VIRTUAL ENVIRONMENT

CROSS-REFERENCE TO RELATED APPLICATIONS

This application claims priority to U.S. Application Ser. No. 60/915,499 entitled CHARACTER TRAINING AND DEVELOPMENT and filed on May 2, 2007; U.S. Application Ser. No. 60/948,846 entitled SCHOOLS AND OTHER EDUCATIONAL ACTIVITIES FOR VIRTUAL REPRESENTATIONS OF REAL TOYS AND THEIR OWNERS and filed on Jul. 10, 2007; U.S. Application Ser. No. 60/950,039 entitled BANKING, SHOPPING, WORKING AND OTHER ACTIVITIES OF VIRTUAL REPRESENTATIONS OF REAL TOYS AND THEIR OWNERS and filed on Jul. 16, 2007; the entireties of which are incorporated herein by reference.

TECHNICAL FIELD

The present invention relates generally to computer-based profile development of a virtual character or a virtual pet in a virtual environment. More specifically, this application relates to providing an online social environment in which virtual characters or pets can develop their individual profiles to learn new skills and gain attributes, which by doing so, enhances the characters' social and play time experience

BACKGROUND

The Internet has become a common resource for entertainment seekers. Through various entertainment websites, virtual communities have been established that allow users to create a virtual or online reality for themselves. Computer games have also crossed over into the online world, allowing users to play against or along with each other from the comfort of their own personal Internet connections located across town or across the country. When it comes to most online entertainment activities including gaming and virtual communities, a disconnection unfortunately exists between objects in the real world and objects in the online world.

More recently, however, entertainment websites have been developed in which the website content is directly tied to a product that is purchased by a user. For example, as disclosed in United States Patent Application Publication No. 2005/0192864 to Ganz, incorporated herein by reference, a user purchases a toy that includes a secret code provided in the toy packaging. Access to a certain interactive content on the website provided by the manufacturer of the toy is restricted to users who purchase a toy. When the user carries out a registration process on the manufacturer's website, which involves entering the secret code, a virtual world is presented to the user. The virtual world includes a virtual toy corresponding to the toy purchased by the user. The user can participate in various interactive activities involving the virtual toy. The user may then purchase additional toys and enter the secret codes provided with those toys to add additional virtual toys to the virtual world. These virtual toys can interact with each other, thereby enhancing the user's entertainment experiences. Despite the popularity of such websites, consumers continue to demand more interactive capabilities and more flexibility with respect to their online or virtual reality products.

SUMMARY

The subject application involves a system and method that facilitates attribute building for characters in a virtual environment.

According to one embodiment, the system can include a real-time monitoring component that receives a training request for a training session associated with at least one attribute, wherein the training request is submitted on behalf of a character, and that determines whether a minimum real-time threshold value has been satisfied in order to permit further processing of the training request; a health analysis component that evaluates a health status of a character to determine whether the character is able to participate in training; a training selection component that determines a level of training for the character based at least in part on the character's training history, selects the training session based at least in part on the character's training history, and presents the training session on-screen; and a performance indicator display that presents a grade, score or final result of the training session on-screen, wherein successful completion of the training session facilitates advancement to more difficult levels of training sessions for the at least one attribute and wherein the at least one attribute increases social status and/or value of the character in the virtual environment.

According to another aspect of the application, the method can include receiving a training request for a training session associated with at least one attribute, wherein the training request is submitted on behalf of a character, and determining whether a minimum real-time threshold value has been satisfied in order to permit further processing of the training request; evaluating a health status of a character to determine whether the minimum health threshold value is satisfied in order to permit further processing of the training request; when at least one of the minimum real-time threshold value and the health threshold value is satisfied, determining a level of training for the character based at least in part on the character's training history, selecting the training session based at least in part on the character's training history, and presenting the training session on-screen; and when the training session has ended, presenting a grade, score, or final result of the training session on-screen, wherein successful completion of the training session facilitates advancement to more difficult levels of training sessions for the at least one attribute and wherein the at least one attribute increases social status and/or value of the character in the virtual environment.

A training session can include but is not limited to a job, position, class, assignment, or exercise. Training sessions can charge a fee per session; however virtual currency or cash prizes or other physical skills can be awarded or unlocked upon successful completion of at least some training sessions. In other training sessions, credit is awarded for successful completion, whereby an accumulation of credit can advance the character to a higher level of training session associated with an attribute.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 3 is an exemplary user interface of a character's resume that records jobs, positions, and/or other training activities that represent one or more attributes in accordance with an aspect of the subject application.

DETAILED DESCRIPTION

The subject application as described in greater detail below relates to systems and methods that facilitate developing and improving a virtual character's profile, and in particular, the character's attributes in order to enhance play time and social interactions within a virtual environment. Each or any character in this virtual environment may have a profile that dictates the character's personality, responses to questions or circumstances, and likes and dislikes (e.g., favorite foods, favorite hobby, least favorite food, food allergies, etc.). The profile can be primarily selected for each character or pet based on the type of character. Alternatively, the profile can be randomly selected. Initially, the profile may be system-determined, whereby a user who controls the virtual character in the virtual environment has had practically no input into which profile is associated with her character.

The systems and methods discussed herein provide a mechanism that allows users to have more input and influence in customizing their virtual characters' profile by developing their attributes. Additional attributes that can be developed include, but are not limited to, strength, speed, agility, intelligence, creativity, style, streets-smart, safety-awareness, grooming, cooking, and manners. Jobs, tasks, classes, sessions, and the like, as well as competitions can be created that emphasize one or more attributes to facilitate encouraging users to have their characters learn, master, and test such new skills. Ultimately, users are taught or reminded of fundamental lessons and their respective characters can enjoy additional praise, rewards, prizes, and other benefits in the virtual environment for their achievements in acquiring new attributes.

Various restrictions or prerequisites may be implemented in order to manage and provide a progressive training and learning scheme. For example, there can be a plurality of classes associated with an attribute. The plurality of classes can be organized by level of difficulty, requiring characters to successfully complete each level before advancing to a subsequent, more difficult level.

As used herein, the terms "character" and "user" may be used interchangeably with the understanding that the user controls the actions and interactions of his/her character unless otherwise noted. Further, many of the exemplary user interfaces represented within FIGS. 2-28 depict a character participating in a training session (e.g., job or class); thus the activity is performed through the perspective of the character to create an impression that users are training their respective characters rather than themselves. Such user interfaces are also character-specific meaning that the user interface for any particular training session will show each user's character enrolled therein, rather than a generic character.

Figure 1:
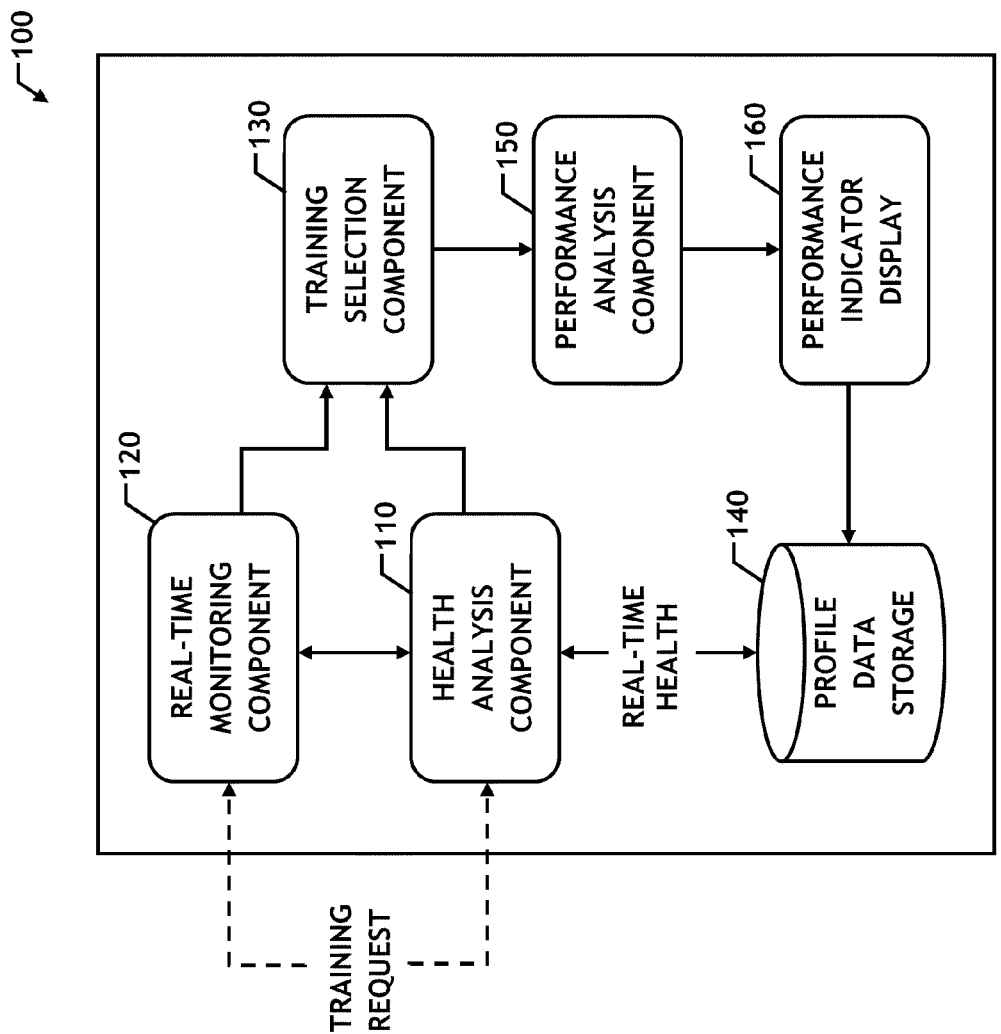
FIG. 1 is a block diagram of an attribute training system that facilitates developing and improving a virtual character's attributes to enhance interactive play and status within an online social environment.
Figure 2:
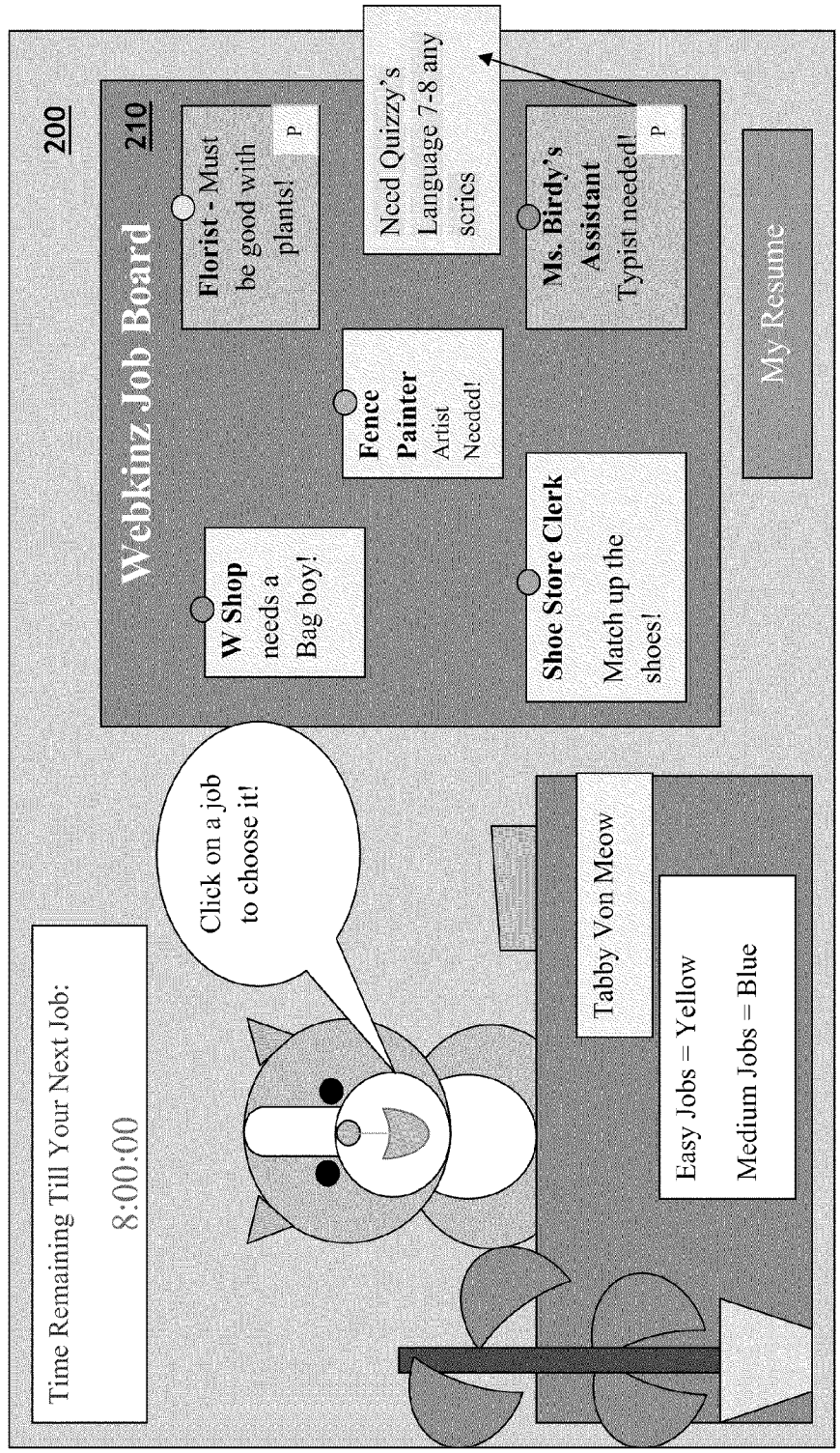
FIG. 2 is an exemplary user interface for an employment office in which a character can apply for a job or position in order to obtain new or improve existing attributes in accordance with an aspect of the subject application.
Figure 4:
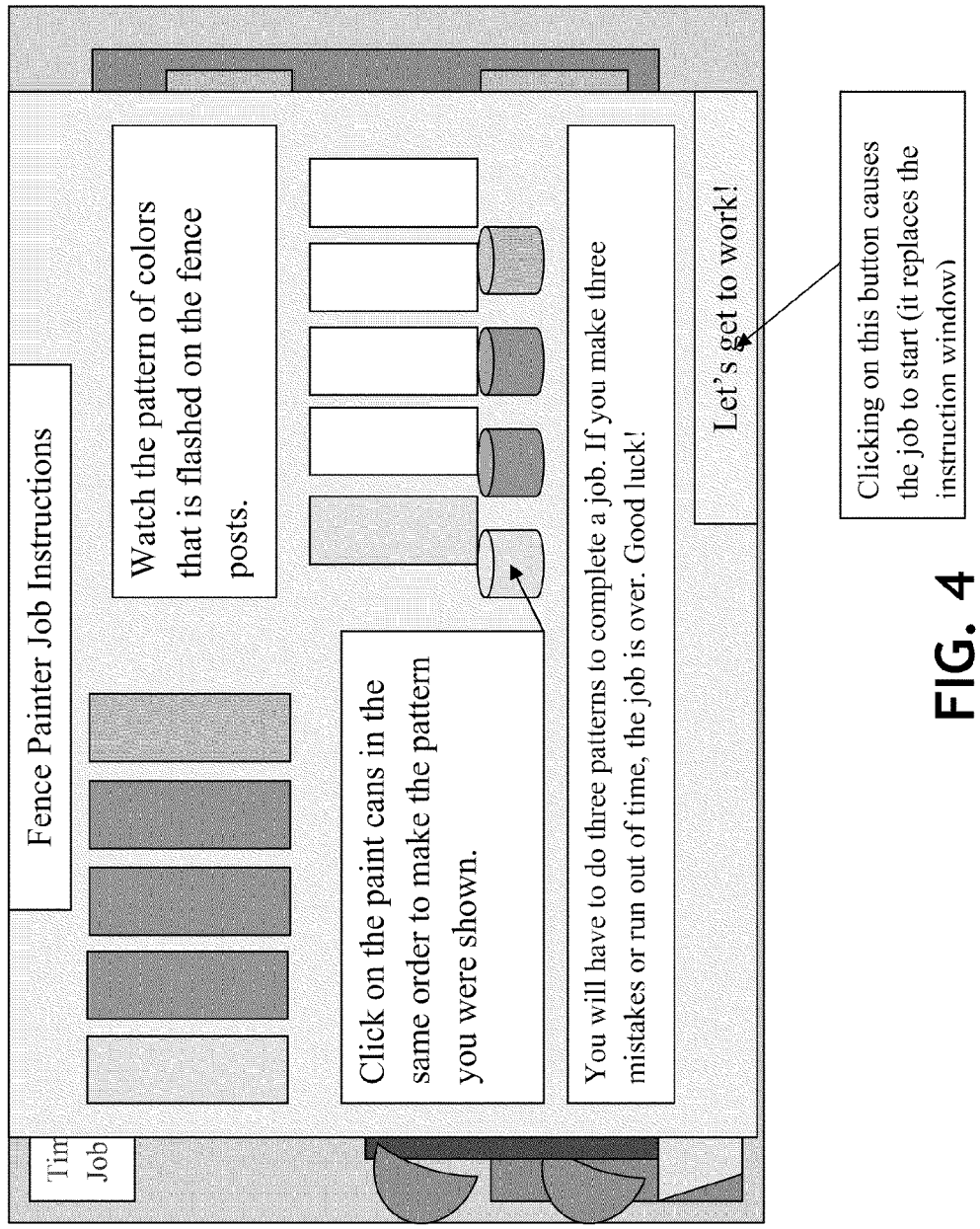
FIG. 4 is an exemplary user interface for a job posting in which a character can apply for in order to obtain new or improve existing attributes in accordance with an aspect of the subject application.

Referring now to FIG. 1, there is a block diagram of an attribute training system 100 that facilitates developing and improving a virtual character's attributes to enhance interactive play and social status within an online social environment. The system 100 includes a real-time monitoring component 110 and health analysis component 120. When a training request is submitted for a character and received by the system 100, that request can be routed initially to either the real-time monitoring component or the health analysis component 120. The real-time monitoring component analyzes the character's activity history 130 to determine the length of real time that has passed since the character's last training session. For example, a character may only be allowed to participate in one class or job every m hours, where m is an integer greater than or equal to zero.

Alternatively or in addition, the real-time monitoring component can determine how many training sessions the user has participated in within a 24-hour period. For instance, each user may only be allowed to partake in t training sessions within a 24-hour period, where t is an integer greater than or equal to zero.

According to one embodiment, users may only be allowed to complete one of any activities in any day.

If the user is within the time or number-of-sessions limit, then the system 100 proceeds. Otherwise, a notice message can be displayed or announced to the user along with an indication of when the user can return to sign up for the desired training. As used herein, a training session can include a job, an assignment, or a class. Credit, in terms of developing a particular attribute, can be given to the character upon completion, upon satisfactory completion, or upon completion under the stated conditions. For example, some training sessions may require only completion in order for the character to receive "credit" for the training or to be considered trained in the task or trained at a particular level of skill of an attribute. While others might only award credit if the character completes the training within q seconds, where q is an integer greater than zero.

The training request can also be received by a health analysis component 120 which can also serve as a requirement that must be satisfied before a training session can begin. The health analysis component 120 accesses health status information of the character in real-time from a profile data storage 140. More specifically, the health analysis component 120 retrieves the character's current health status which can be a qualitative status such as "sick" or "healthy" or a health status value that indicates "sick" or "healthy" or varying degrees thereof. The health analysis component 120 evaluates the health status to determine whether the character is able to participate in training. For example, if the character has an acceptable health status, then the character can be cleared for training and the training request can proceed through the system 100. Additionally, the system 100 can be programmed to direct "sick" characters to a medical clinic for care and medicine and to notify the user that the character is ineligible to participate in training when "sick." When the character's health status upgrades to an acceptable status, the system 100 can observe the change and notify the user that the character is now eligible to participate in training.

The system 100 can route a training request initially to either the real-time monitoring component 110 or the health analysis component 120; or the information in the training request can be sent to both components 110, 120 at the same time for analysis. In the alternative, parameters for each may be set such that one or both components 110, 120 can essentially be turned on or off, thereby accepting all training requests that are submitted.

Once the request satisfies the requirements of the health analysis component 120 and/or the real-time monitoring component 110, the request is processed by a training selection component 130. The training selection component 130 determines the type or level of training desired for the character and selects a training exercise or class for presentation to the user. For example, a character may desire to increase its intelligence by enrolling in a first class that emphasizes intelligence training. Since this is the character's first class associated with the intelligence attribute, the training selection component 130 selects an entry level class that is associated with the intelligence attribute from an appropriate database. However, in a different scenario, the character may have already completed levels 1 and 2 of a track and field class associated with an agility attribute. In this case, the training selection component 130 selects a class from level 3 for the agility attribute. Thus, a character's level with respect to one attribute may not necessarily affect or impact the character's level with respect to a different attribute.

The type of class or training can include, but is not limited to, spatial recognition, memory recall, sequence recognition, object comparison, object identification, matching, math, language, and the like. The difficulty of each type of class can increase as the character advances to subsequent levels of the class. Completion and/or satisfactory completion of a certain number of training classes may be required before the character can advance to a subsequent level.

A performance analysis component 150, also included in the system 100, can evaluate the character's performance in the class, exercise, or job and provide a score, grade, or other result accordingly. For example, if the user completes a class with a majority of correct responses or fully performs the activity within the provided conditions, such as a time limitation, then the performance analysis component 150 may determine that the character's performance was satisfactory and award at least one of class credit, currency (virtual cash prizes), or other prizes according to the class or level completed. Completion of a level can require satisfactory or successful completion of one or more classes, exercises, or jobs. Unsatisfactory or unsuccessful completion of multiple classes at a particular level can result in demotion to the previous level, if available.

A performance indicator display 160 can then present the grade or score to the user such as "HOORAY, YOU PASSED!" or "GREAT JOB! A+" or "Your Score: 8.5— Highest Score Possible: 10.0", for example. It should be appreciated that the scoring or grading values can depend on the activity and any suitable scoring system and value set may be employed.

Once a class or a level is completed, the character's profile, report card, or resume, for example, may be updated accordingly, thereby increasing the character's social status or value in the virtual environment. Furthermore, the character's core profile parameters such as health or happiness can be influenced and affected by the character's report card or resume. In particular, as more classes or exercises are completed and added to the character's resume or report card, the character's happiness parameter may increase accordingly. Likewise, as classes are taken and/or completed, the "additional activity" required to participate in such can physically affect the character's hunger and health—especially when the classes require physical activity (e.g., running, diving, hairstyling, painting, etc). Thus, the hunger and health parameters may indicate that the character needs to re-fuel or rest before continuing with additional classes or exercises.

In some instances, the character may not be able to enroll into class if the health and/or hunger parameters do not satisfy a minimum threshold value (numerical) or rating (e.g., sick, healthy, hungry, very hungry). For example, if a character's health status is "sick", then the character will not be permitted to enroll in a class, apply for a job, or participate in an exercise session. The "sick" character may be transferred to a medical clinic or may be required to go to the clinic before further participation in such class, job, or exercise is allowed. Likewise, characters deemed to be very hungry can be required to eat before being allowed to participate in a training activity.

The following set of figures represents exemplary user interfaces for exemplary classes, jobs, or exercises in which a character can participate in order to obtain new and/or improve their existing attributes. As additional attributes are gained and mastered, the social status and/or value of the character increases in the virtual environment. Furthermore, additional activities such as competitions, beauty pageants, and the like can be made available to "qualified" characters. As will be explained in more detail below, the characters can compete against one another with or without their respective user's involvement. Selection, wins, and/or placement in such competitions can further increase the character's social status and value and create other opportunities for more exclusive competitions or adventures.

Turning now to FIGS. 2-9, there are depicted an exemplary employment office 200 and various positions listed for which a character can apply. The user interface for the employment office 200 can include a job board 210 on which one or more jobs are posted. Each job posting can include a brief description of the job as well as any prerequisites needed before the job can be applied for or performed. For example, a job entitled Ms. Birdy's Assistant includes a symbol "P" on the posting which indicates to the user that a prerequisite is required in order to do the job. In this case, the prerequisite is a language skill 7-8 any series (e.g., Quizzy's Language).

The employment office 200 user interface can also include a real-time timer and/or clock which lets the user know when his/her active character can apply for another job. For example, the system can implement a 5-hour hold period where a user is not allowed to undertake a new job until 5 hours from the completion of the most recent job. The clock can run either in real-time or based on the user's online (logged in) time. Since incentives including currency or other prizes that are deemed to be valuable in the virtual environment can be earned from performing various jobs, the number of opportunities a user has to gain currency or prizes for its character is controlled and managed.

The employment office 200 UI can also include a link to the character's resume such as an exemplary resume shown in FIG. 3. The character's resume can list the jobs that the character has performed, the level of each job as well as whether the character succeeded. In some cases, the number of attempts can be limited or alternatively, the number of attempts can be unlimited. When repeated attempts without success are made for a higher level of job, the character may be required to perform another job at a lower level before being allowed to make another attempt at the higher level job. It should be appreciated and understood that various combinations of conditions, limitations, restrictions, and rules can be applied in order to maintain a challenging yet fun structure of encouraging characters to obtain new or improve their existing attributes.

As the character's resume grows, the system 100 (FIG. 1) can analyze the resume content and suggest which available postings might be best suited for the character. For instance, Tabby Von Meow can recommend the shoe store clerk or assistant position to the character-based on the character's current resume. In addition, Tabby can also recommend that the character not apply for the florist position until additional training, jobs or classes are taken-some which may or may not be prerequisites for the job.

The postings can also be coded such as through the use of symbols or color (e.g., yellow, blue, orange, etc.) to visually indicate the difficulty level of the available jobs. On the user interface, for example, yellow indicates an easy job and blue indicates a job of medium or moderate difficulty. In addition, difficult jobs may be in red or orange.

If a character attempts to apply for a job but does not have the prerequisites for such job, Tabby will visually or audibly indicate that the character is not qualified and/or may state the needed prerequisite. If the user succeeds, then the character is brought back to the employment office 200 and the timer is reset. In addition, the character may be notified that it has reached a new level of a job when that occurs. If the user does not succeed, the user is also brought back to the employment office and encouraged to come back and try again. Multiple failures on a particular level of job can cause the character to be demoted to the previous level or remain at starting level (e.g., Level 1). Likewise, more than one success (e.g., 3 successes) at a level can be required before the character is promoted to the next level. Further, the available jobs can be selected randomly regardless of the character or selected based on the character's work history and/or most recently attempted (unsuccessful) or completed (successful) job (e.g., training selection component 130 in FIG. 1).

Figure 9:
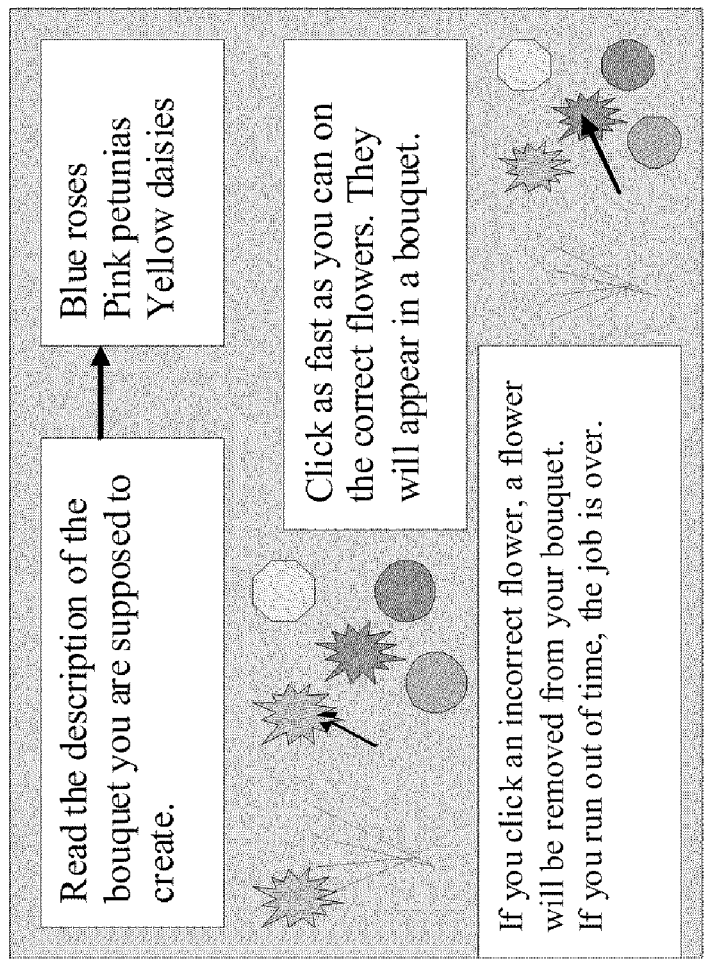
FIG. 9 is an exemplary user interface for a job posting in which a character can apply for in order to obtain new or improve existing attributes in accordance with an aspect of the subject application.

Turning now to FIGS. 4-9, there are demonstrated exemplary user interfaces for various jobs including, but not limited to, a fence painter (FIG. 4), shoe store clerk (FIG. 5), a doctor's assistant (FIG. 6), grocery store bagger (FIG. 7), an office assistant (FIG. 8), and a florist (FIG. 9). As previously discussed, these jobs or training exercises can be performed in order to obtain new or improve existing attributes. Such attributes can be later employed to earn additional prizes, currency, or opportunities to participate in specialized activities or games in the virtual environment.

For each job, instructions are given as well as any time limitation for completing the job. The character is also informed that the job will end when at least two or more mistakes are made. The wage information that can be earned upon successful completion can also be indicated to the user and reflected on the character's resume. As previously mentioned, one or more prerequisites may be required before a job can be performed (e.g., before the user's application or request to perform the job is accepted).

Referring again to FIG. 4, instructions for a fence painter job are illustrated. In this exemplary task, the character by way of its user is asked to watch a pattern of colors that is flashed on the fence posts . . . and then to click on the paint cans in the same order to make the pattern that was shown. The instructions further state that the character by way of its user will have to complete three patterns within the given time limit in order to successfully complete the job. If time runs out or if three mistakes are made before completion, then the job ends and presumably no credit or other compensation is awarded to the character. It should be appreciated that the tasks described and illustrated in FIGS. 4-9 are merely exemplary and other tasks may be provided under the titles of fence painter (FIG. 4), shoe store clerk (FIG. 5), a doctor's assistant (FIG. 6), grocery store bagger (FIG. 7), an office assistant (FIG. 8), and a florist (FIG. 9).

Figure 5:
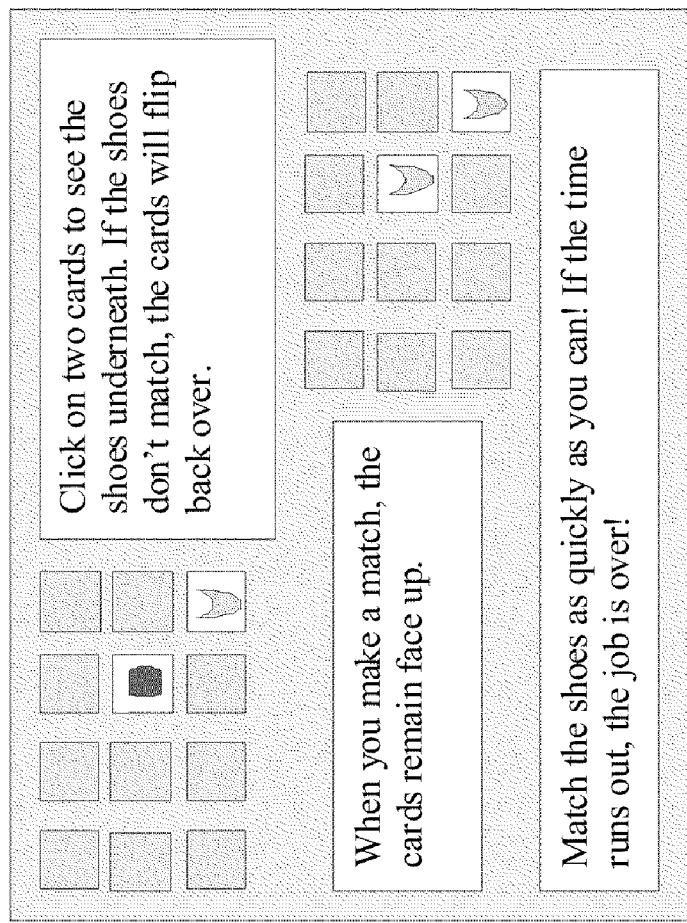
FIG. 5 is an exemplary user interface for a job posting in which a character can apply for in order to obtain new or improve existing attributes in accordance with an aspect of the subject application.

In FIG. 5, instructions for a shoe store clerk are depicted. Here, the user must find all the matching shoes, as drawn on the cards, as quickly as possible before time runs out.

Figure 6:
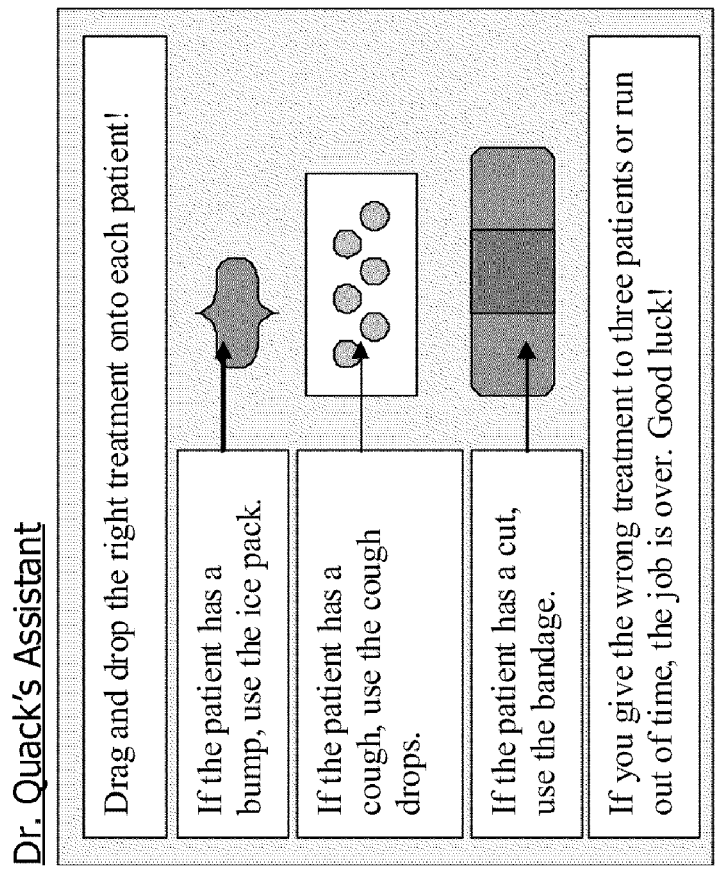
FIG. 6 is an exemplary user interface for a job posting in which a character can apply for in order to obtain new or improve existing attributes in accordance with an aspect of the subject application.

FIG. 6 provides instructions for a doctor's assistant, in which the user is asked to match the treatment to the patient. The wrong treatment given to three patients or running out of time before completion will end the job.

Figure 7:
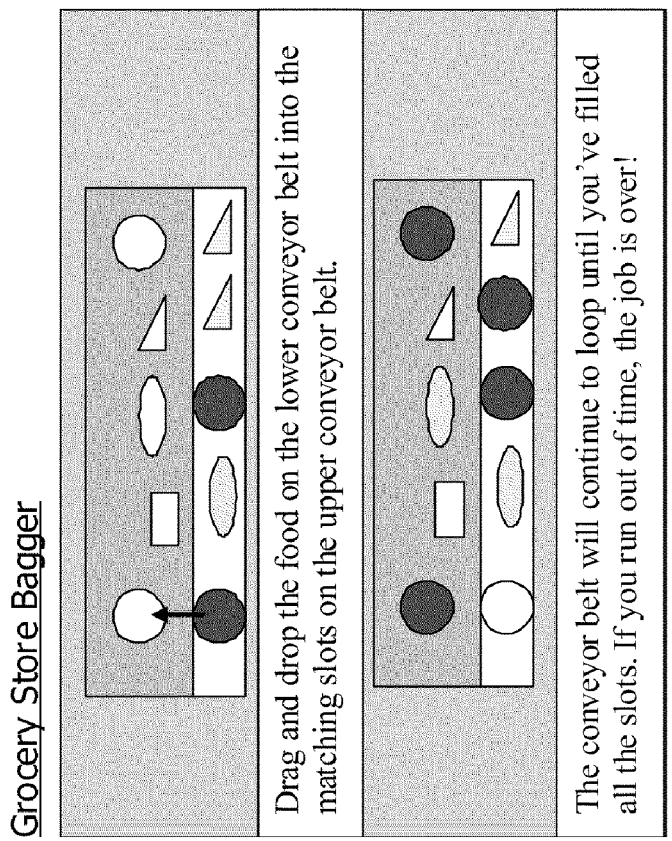
FIG. 7 is an exemplary user interface for a job posting in which a character can apply for in order to obtain new or improve existing attributes in accordance with an aspect of the subject application.
Figure 8:
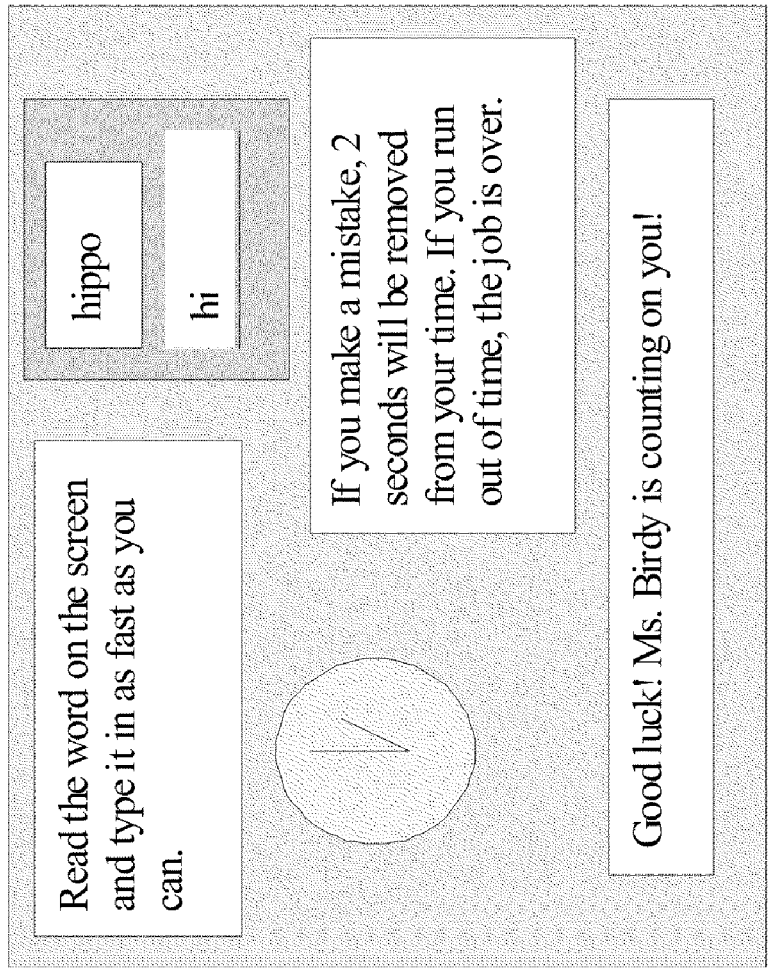
FIG. 8 is an exemplary user interface for a job posting in which a character can apply for in order to obtain new or improve existing attributes in accordance with an aspect of the subject application.

As a grocery store bagger, the instructions in FIG. 7 provide that the user is to match the item located in the lower conveyor belt to its appropriately shaped slot in the upper conveyor before time runs out. As Ms. Birdy's Assistant in FIG. 8, the user is tasked with properly reading the word and spelling it as quickly as possible. If a mistake is made, then 2 seconds will be removed from time allotted and the job is terminated once time runs out. In this particular scenario, prerequisites are listed to inform the user that minimum requirements exist before the job can be attempted by the character. Exemplary prerequisites for a job can include but are not limited to, successful completion of a certain level of math or quiz related questions or the performance of one or more other "games" or educational related exercises related on the staff.

Finally, FIG. 9 demonstrates instructions for a florist position, where the user is asked to arrange a set of flowers to match a reference bouquet of flowers. Performance or success can be determined based on a graded scale, where a close match earns a lower score or a lesser amount of virtual compensation than a perfect match. Alternatively, an exact match can be required in order to receive payment for the job.

Figure 10:
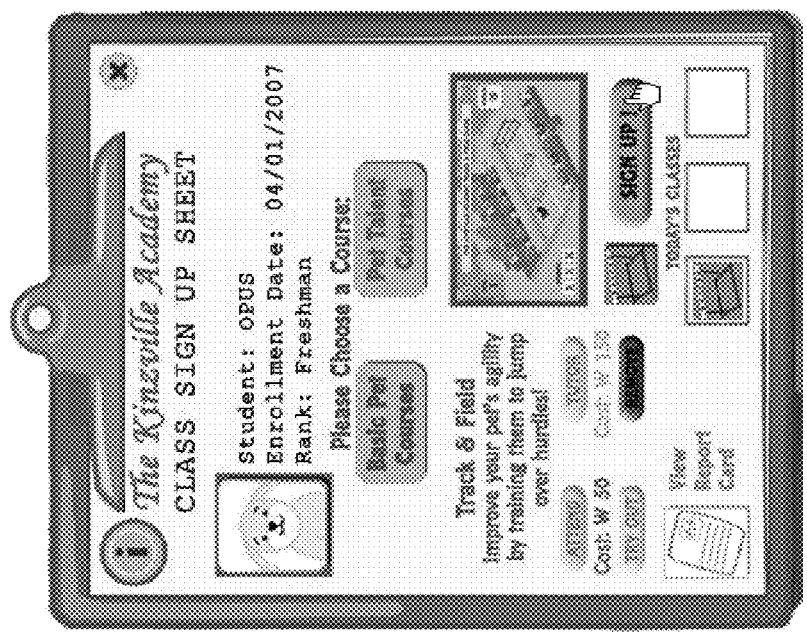
FIG. 10 is an exemplary user interface for a class or training activity sign-up sheet in which a character can request enrollment or enroll in order to obtain new or improve existing attributes in accordance with an aspect of the subject application.

Referring now to FIG. 10, there is depicted an exemplary user interface for a class or training activity sign-up sheet in which a character can request enrollment or enroll in order to obtain new or improve existing attributes in accordance with an aspect of the subject application. As particular attributes are improved (i.e., success in increasing levels of difficulty in the attribute classes), additional physical skills or movements can be "unlocked" for the character. For example, a strength attribute can permit a character to stomp its foot or stand on two legs (if a four-legged character such as a dog or cat). The level attained within a particular attribute determines which skills are unlocked and when.

Classes, training exercises, and the like can be structured in terms of a school, as is shown in FIG. 10 and in FIGS. 11-28. However, it should be understood, that such classes or training exercises can be structured in other ways as well so long as they convey the practice and learning aspects as described herein. Keeping with a school-like theme, diplomas, badges, or certificates of completion can be awarded to the character upon successful completion of one or more classes or exercises. In addition, such classes or exercises can lead up to opportunities for the character to participate in various types of competitions against other characters with or without user involvement or against a computer-controlled character. As with the availability or frequency of job participation, class participation within a given time frame or period can be limited as well. According to FIG. 10, a character is permitted to enroll in three classes per day—under Today's Classes. Of course, this is merely an example for illustrative purposes and the number of classes per day can change accordingly.

In FIG. 10, a sign-up sheet is illustrated for a track and field class in agility (attribute). Other courses can be made available as well that focus on agility including but not limited to diving (see FIG. 11, infra).

Classes can be attended for a fee or can be enrolled as "tutor" or "tutor only" for a substantially higher fee. To attend a class means that the character will be participating in the activity and must complete the activity under the given conditions in order to receive a passing grade and recognition of a completed class. When enrolled as "tutor" or "tutor only," the character must pay a higher price for the class but there is no activity participation associated with the class. The user or character is essentially paying a premium fee in order to obtain credit for a class. As with the character's resume, a report card can also be maintained to record and maintain a history of the character's classes-enrolled classes, completed classes, scores or grades in each, level of class, associated attribute, etc.

Figure 11:
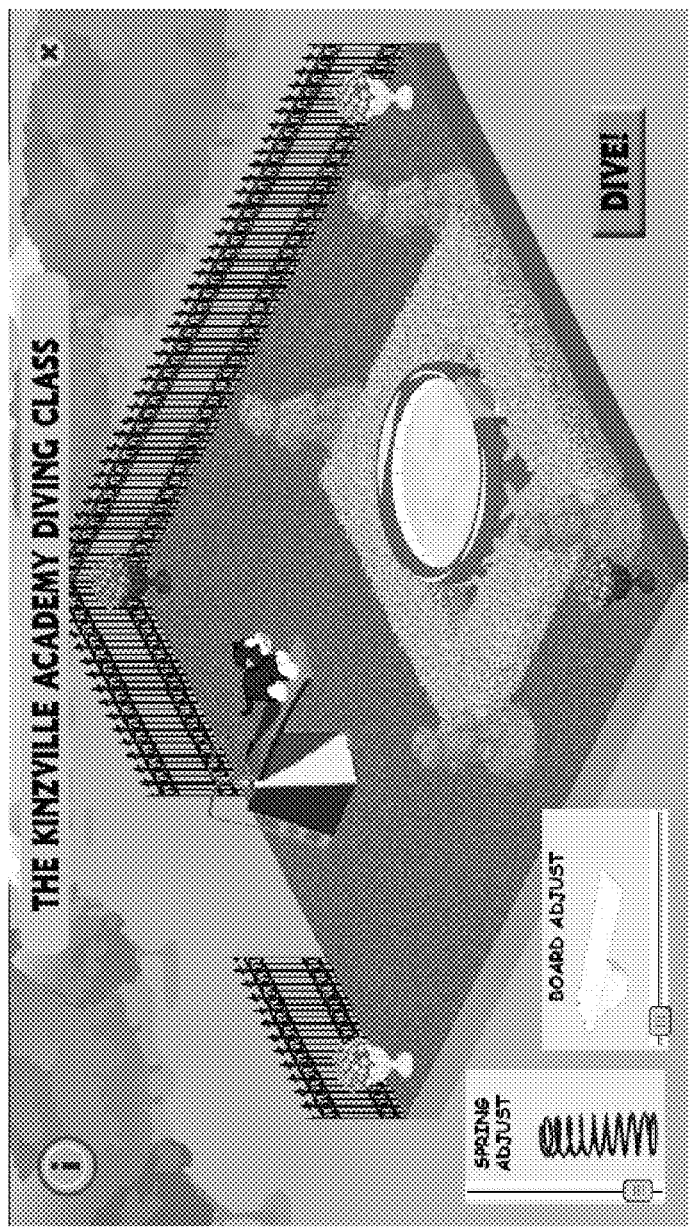
FIG. 11 is an exemplary user interface for a class or training activity in which a character can enroll in order to obtain a new or improve an existing agility attribute in accordance with an aspect of the subject application.

In FIG. 11, the agility attribute is taught through diving, for example. The user may be given a set number of attempts to make a successful dive within an allotted time frame (e.g., 20 seconds, 30 seconds, etc.). Tension in the diving board spring as well as the length of the diving board can be adjusted by the user to enable the character to make a successful dive.

Figure 12:
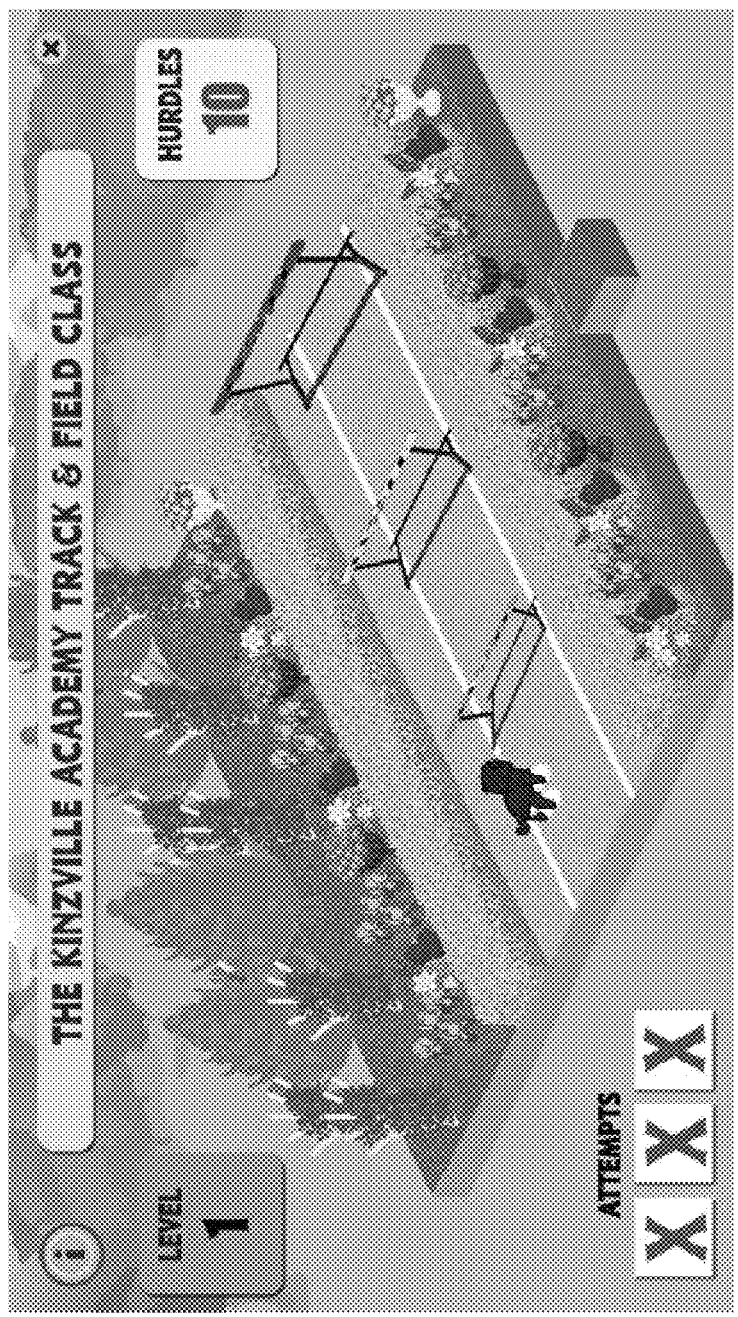
FIG. 12 is an exemplary user interface for a class or training activity in which a character can enroll in order to obtain a new or improve an existing agility attribute in accordance with an aspect of the subject application.

In FIG. 12, the agility attribute is taught through hurdle jumping. At level 1, for example, the character may have to jump 10 hurdles and only may be allowed three attempts. Each class may have multiple levels of difficulty. For instance, there can be 10 levels of difficulty ranging from very easy to very difficult for a track and field class. As the character passes each level, additional skill features can be unlocked. For example, when the character passes level 5 of track and field, the character may be able to do a cart-wheel or back-flip in the virtual environment as another means of expression or physical action. Foot-stomping can be another example of a physical action that is unlocked as an award earned for completing one or more classes or sessions during the training of a strength attribute.

Figure 13:
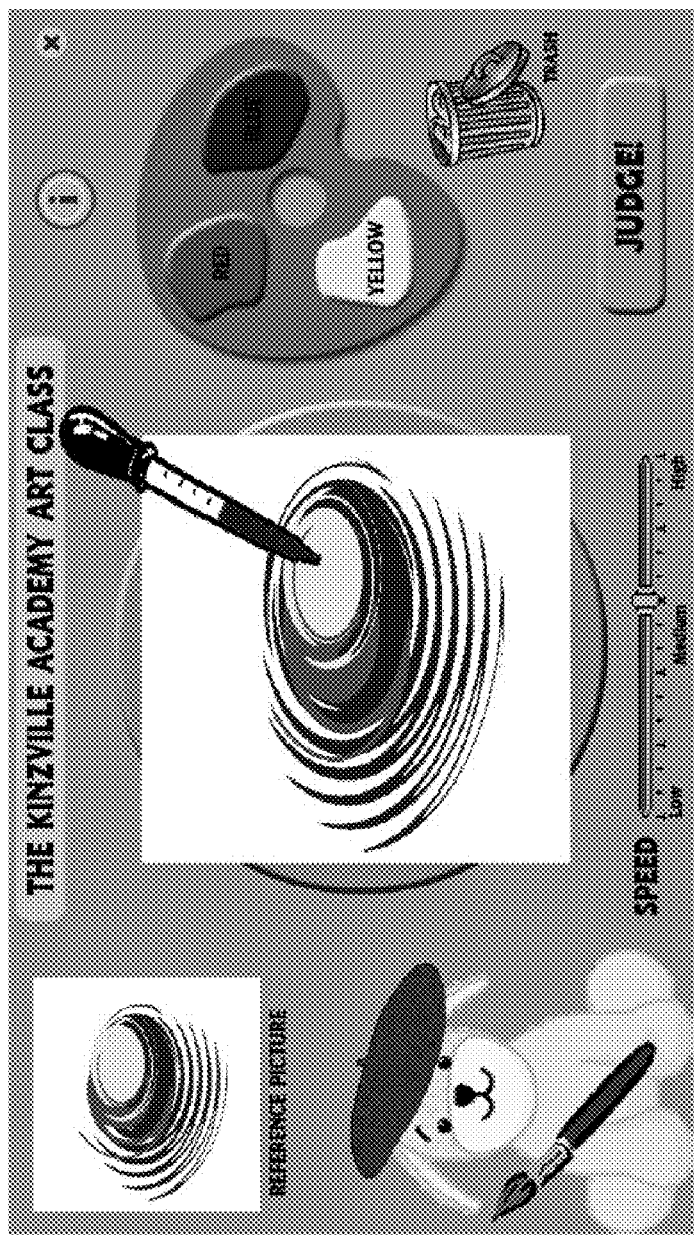
FIG. 13 is an exemplary user interface for a class or training activity in which a character can enroll in order to obtain a new or improve an existing creativity attribute in accordance with an aspect of the subject application.

FIG. 13 teaches a creativity attribute, wherein the character is asked to replicate the reference picture. The character's attempt is then judged and scored.

Figure 14:
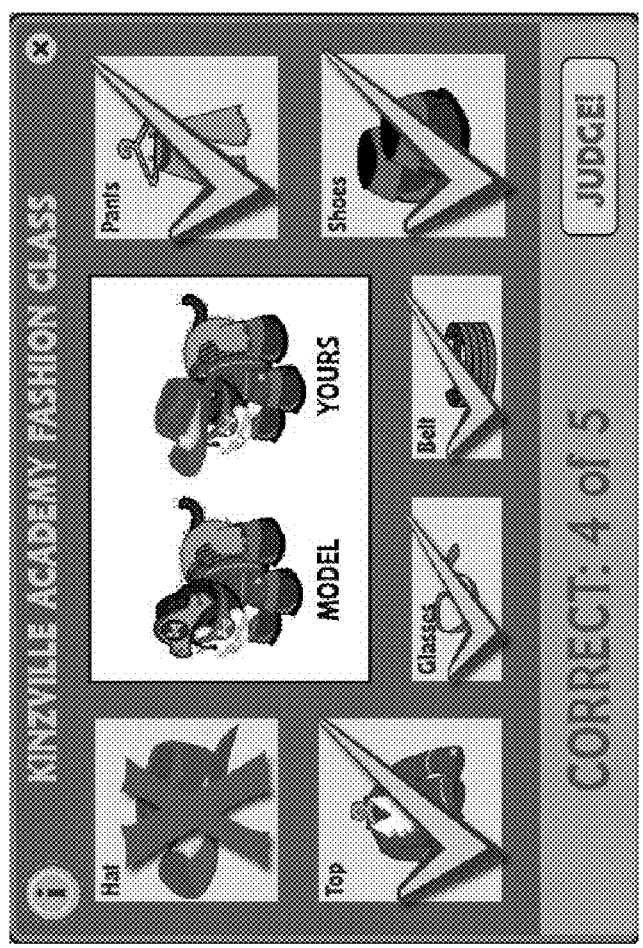
FIG. 14 is an exemplary user interface for a class or training activity in which a character can enroll in order to obtain a new or improve an existing style attribute in accordance with an aspect of the subject application.

In FIG. 14, a style attribute is taught. A character is required to dress itself according to the model's outfit. Once again, the character's attempt is judged and scored.

Figure 15:
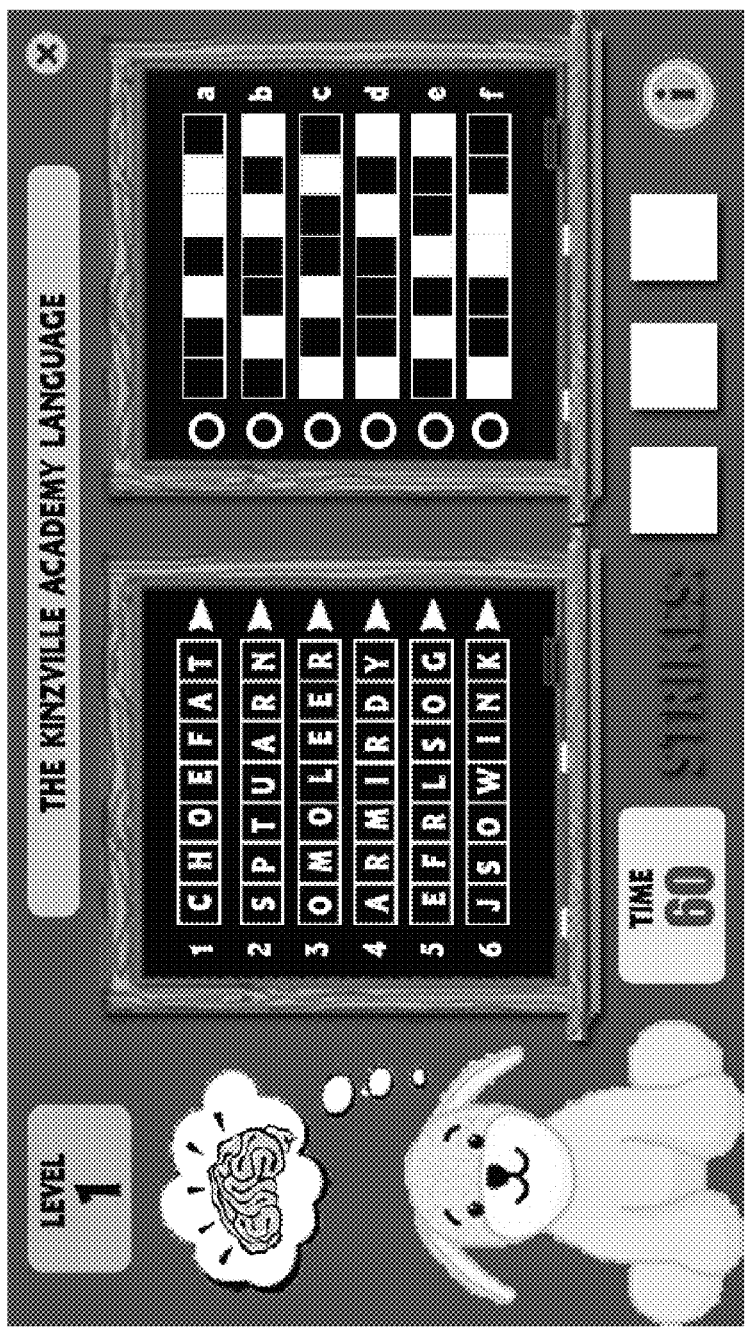
FIG. 15 is an exemplary user interface for a class or training activity in which a character can enroll in order to obtain a new or improve an existing intelligence attribute in accordance with an aspect of the subject application.
Figure 16:
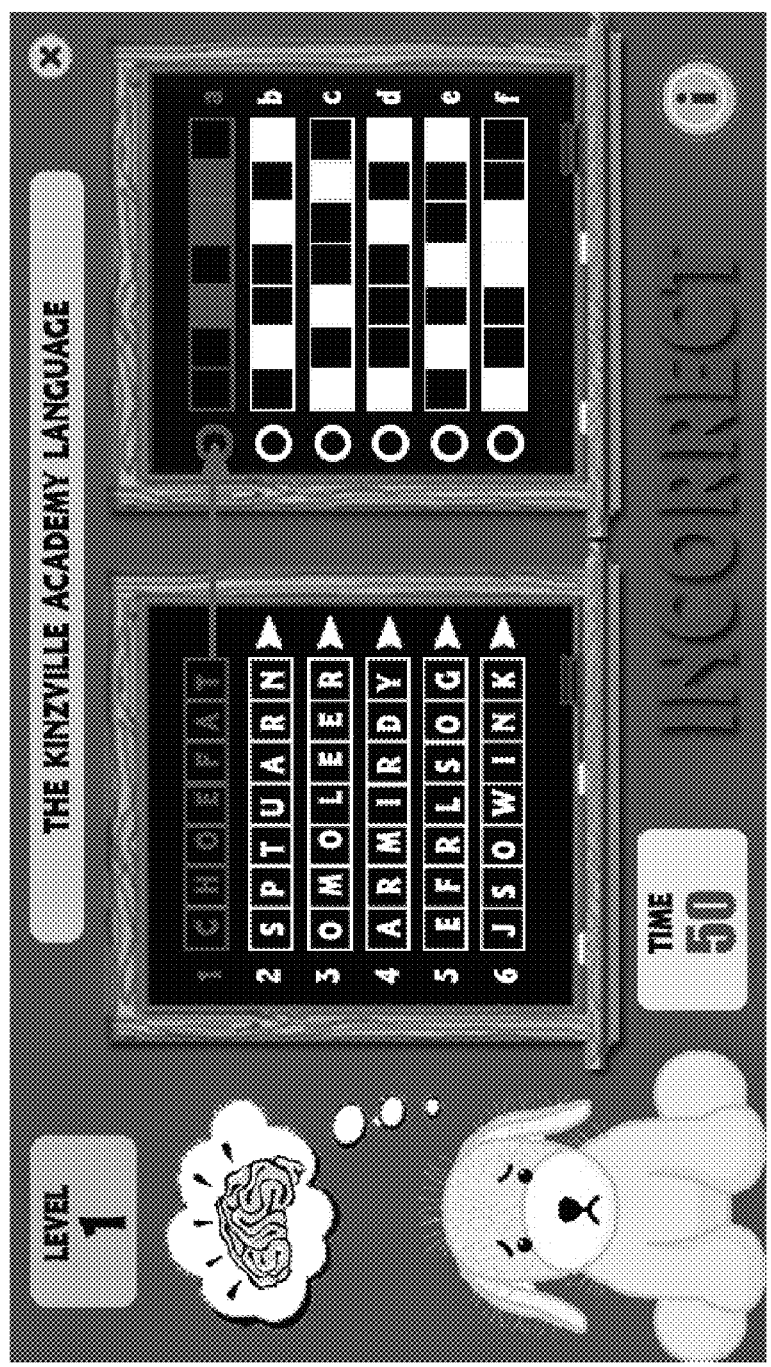
FIG. 16 is an exemplary user interface for the class or training activity of FIG. 15, in which the character has enrolled, in order to obtain a new or improve an existing intelligence attribute in accordance with an aspect of the subject application.
Figure 17:
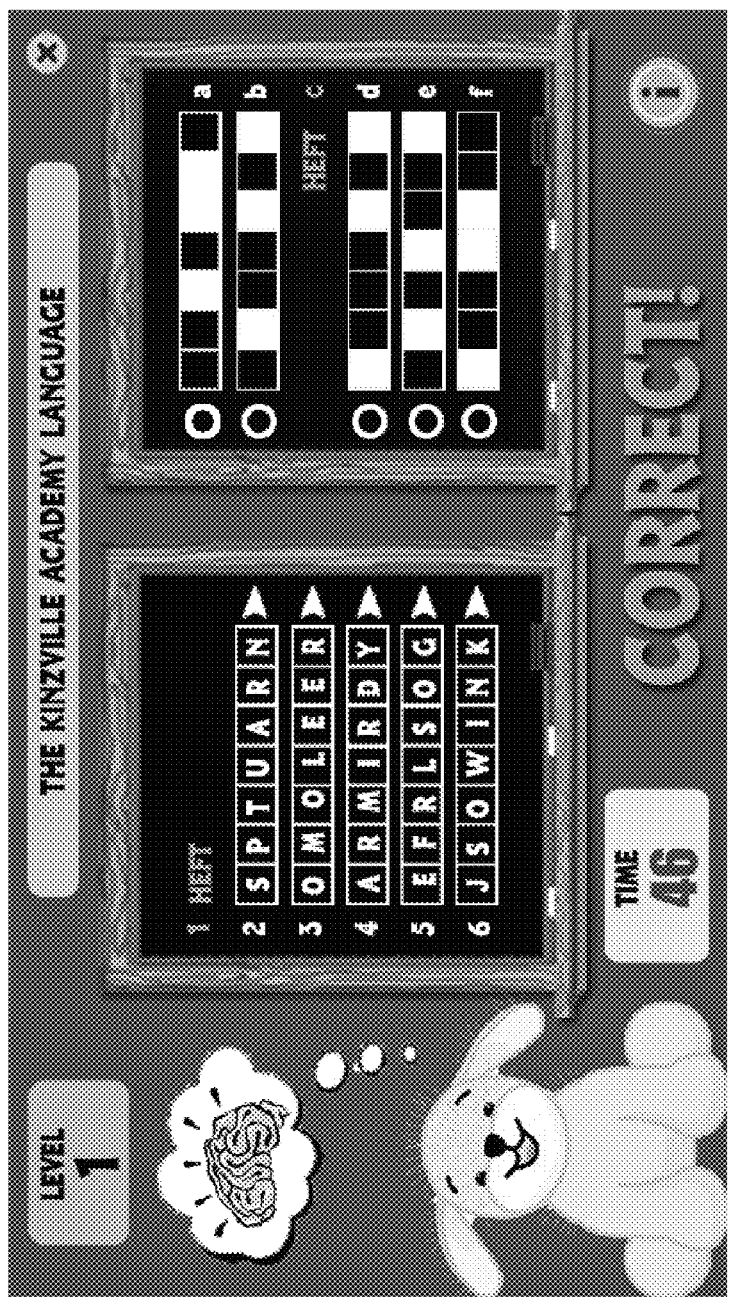
FIG. 17 is an exemplary user interface for the class or training activity of FIG. 15, in which the character has enrolled, in order to obtain a new or improve an existing intelligence attribute in accordance with an aspect of the subject application.

Referring now to FIGS. 15-20, an intelligence attribute is taught using three exemplary challenges involving language skills, spatial recognition, and memory. The character is given a time limit and only allowed three mistakes for the language challenge. When a character has made a mistake, their choice of answer is X'd out or marked accordingly and the correct answer is clearly noted. In particular, FIGS. 15, 16, and 17 demonstrate an exemplary language challenge. In FIG. 15, the level number and challenge is presented and the character participating in the challenge is pictured on-screen. A time clock counts down from 60 seconds and a space to note the number of strikes or wrong answers submitted is shown as well. The challenge here is match the correct line of characters (indicated by line numbers 1 through 6) to the correct row of black and white boxes on the right in order to spell a word using the letters that fall into or correspond to the black boxes. FIG. 16 demonstrates that the character has made an incorrect choice with 50 seconds remaining on the time clock. In FIG. 17, a correct match has been made and 46 seconds remain to complete the task.

Figure 18:
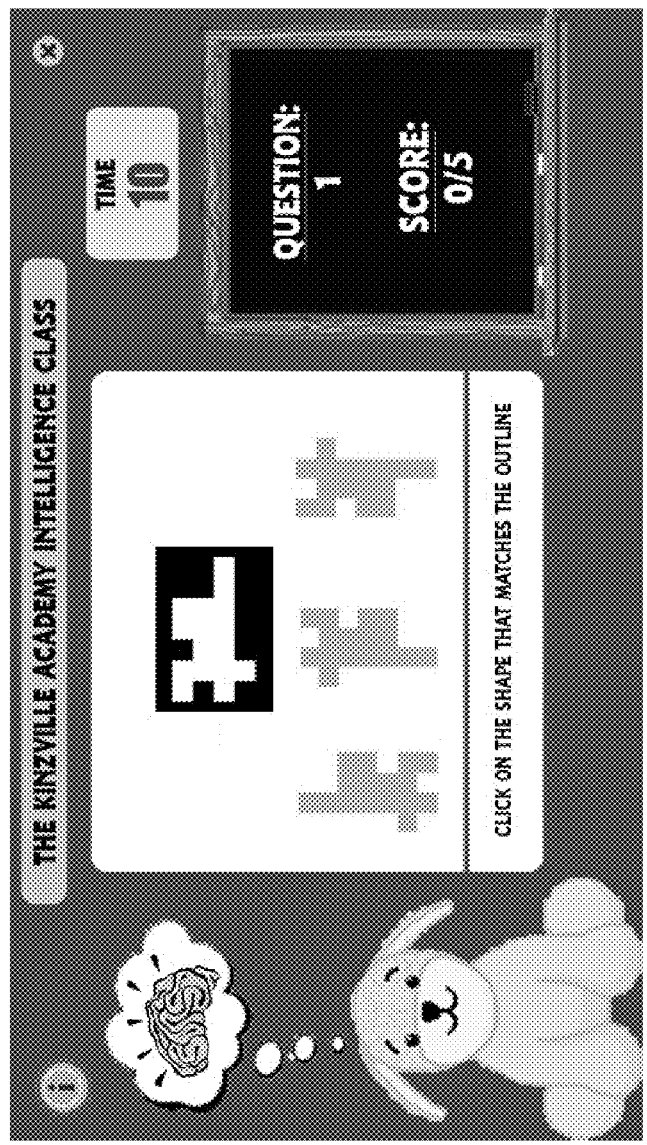
FIG. 18 is an exemplary user interface for a class or training activity in which a character can enroll in order to obtain a new or improve an existing intelligence attribute in accordance with an aspect of the subject application.
Figure 19:
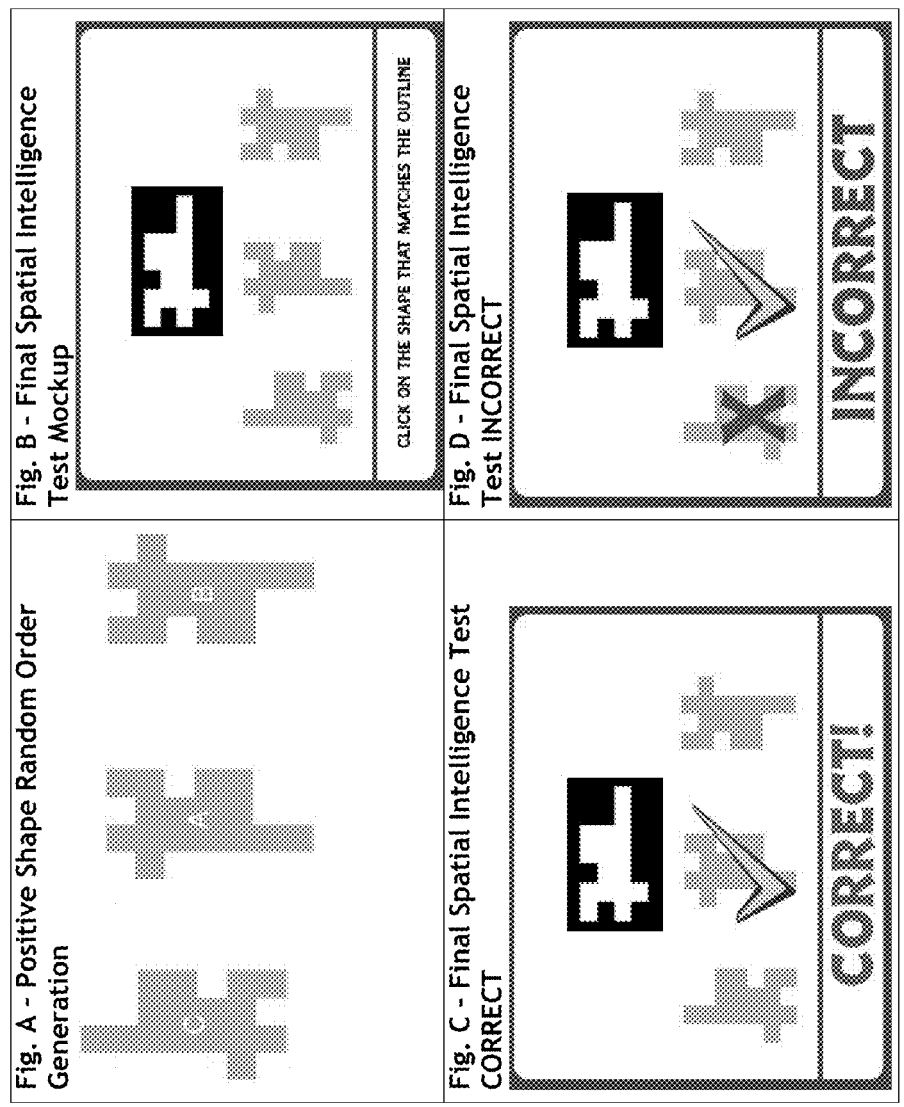
FIG. 19 is an exemplary user interface for the class or training activity of FIG. 18, in which the character has enrolled, in order to obtain a new or improve an existing intelligence attribute in accordance with an aspect of the subject application.

FIGS. 18-19 represent an exemplary intelligence related class. Here, the user, via its character (or vice versa), is asked to select the shape that matches the reference outline. FIG. 19 depicts a positive shape random order generation and an example of a spatial intelligence challenge, as well as what is shown to the user when a correct choice is made and when an incorrect choice is made.

Figure 20:
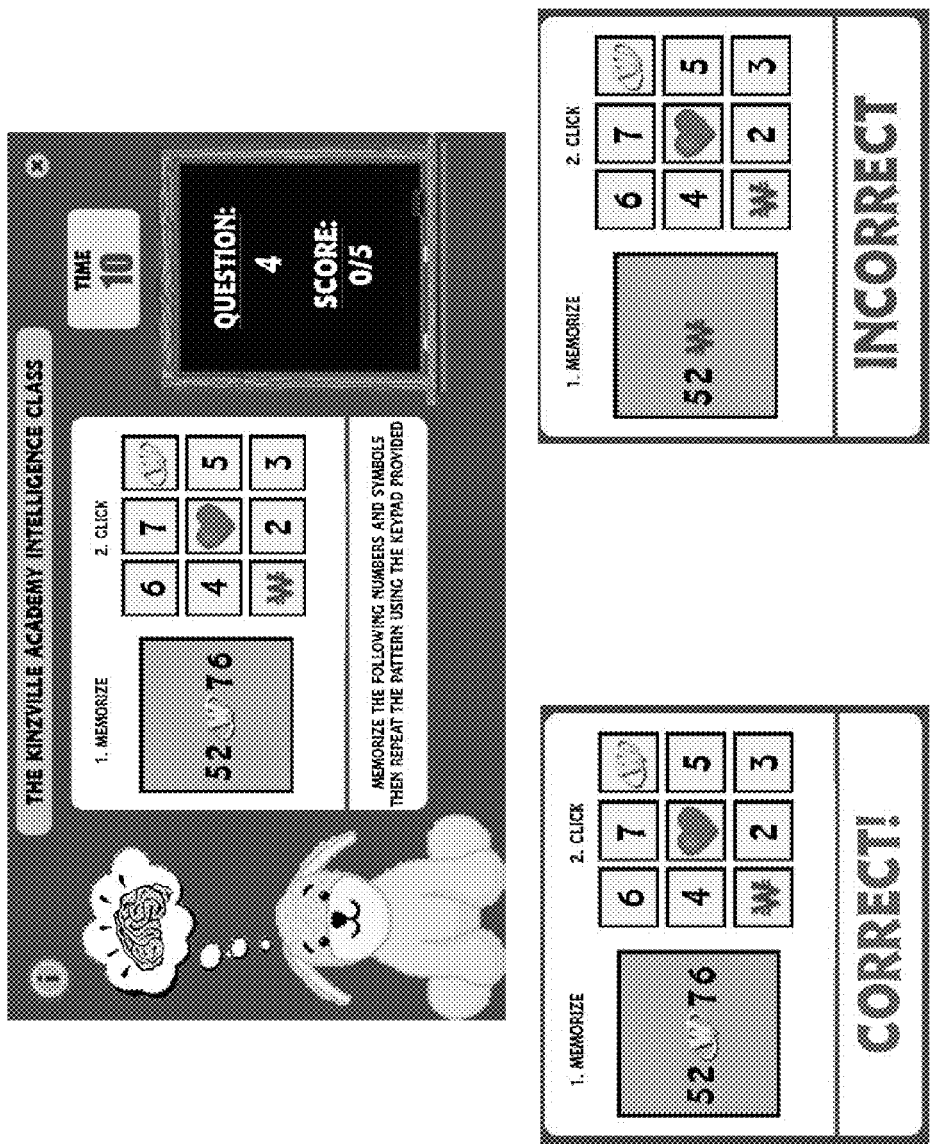
FIG. 20 is an exemplary user interface for a class or training activity in which a character can enroll in order to obtain a new or improve an existing intelligence attribute in accordance with an aspect of the subject application.

Finally, FIG. 20 demonstrates an intelligence class that involves a memory challenge. The specific task involves memorizing a line of characters and repeating the pattern using the provided keypad.

Figure 21:
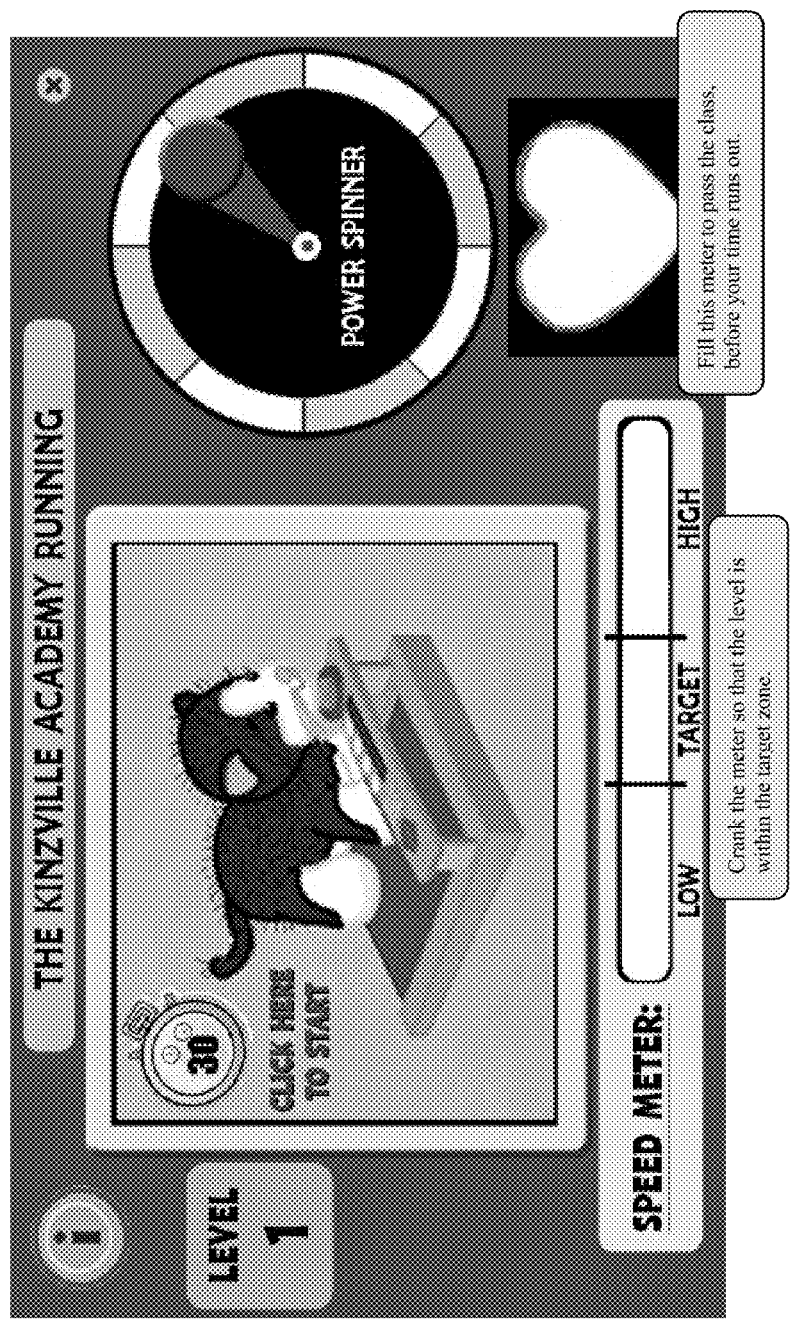
FIG. 21 is an exemplary user interface for a class or training activity in which a character can enroll in order to obtain a new or improve an existing speed attribute in accordance with an aspect of the subject application.
Figure 22:
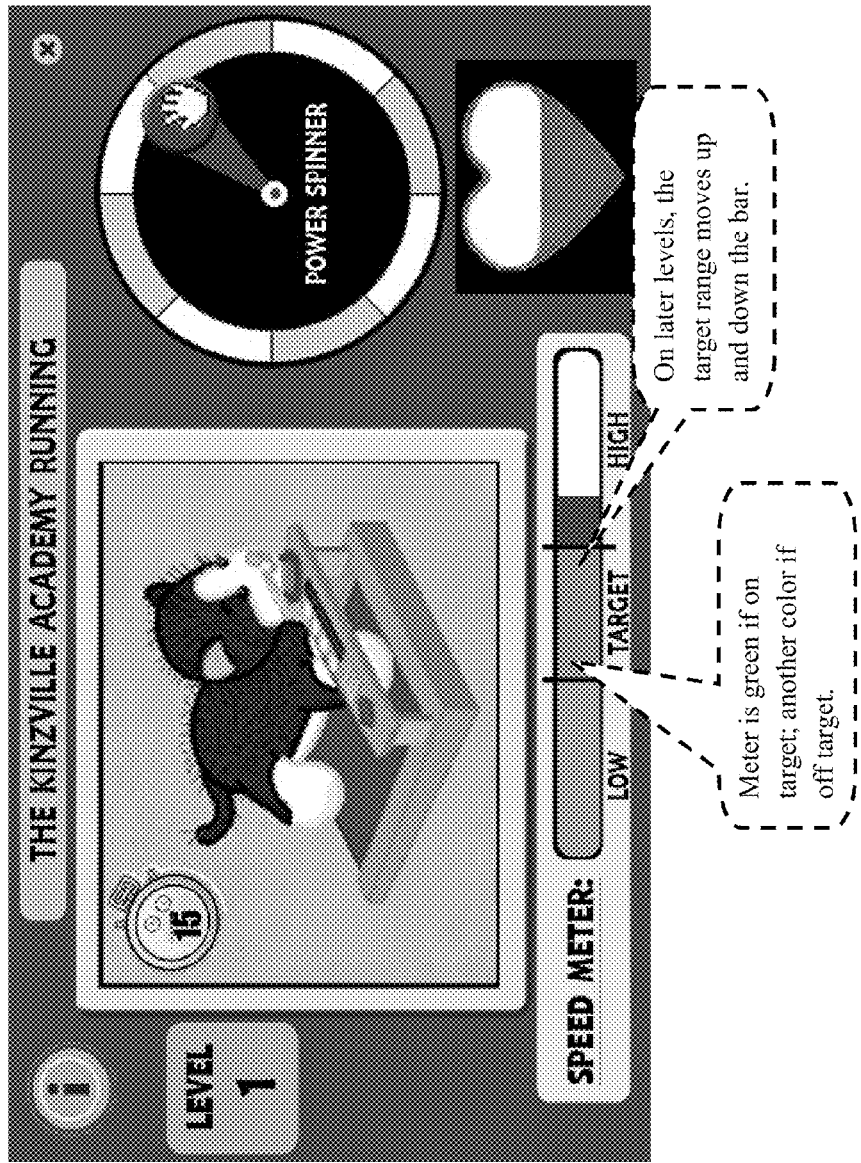
FIG. 22 is an exemplary user interface for the class or training activity of FIG. 21, in which the character is enrolled and participating, in order to obtain a new or improve an existing agility attribute in accordance with an aspect of the subject application.

Another attribute is speed as indicated in FIGS. 21-22. Speed can be taught through classes that emphasize running, for example. Here, a user controls an isometric avatar of their character, making them run on a treadmill at a dictated pace. The object of the training is to crank their power meter in synch with the speed meter. To keep it in synch means that the user has to keep the speed meter within the target area, which is in variable movement up and down the scale. When the user keeps it in the target area, the heart will fill up. If the user falls behind or gets ahead of the target area, the heart will stop filling up.

Figure 23:
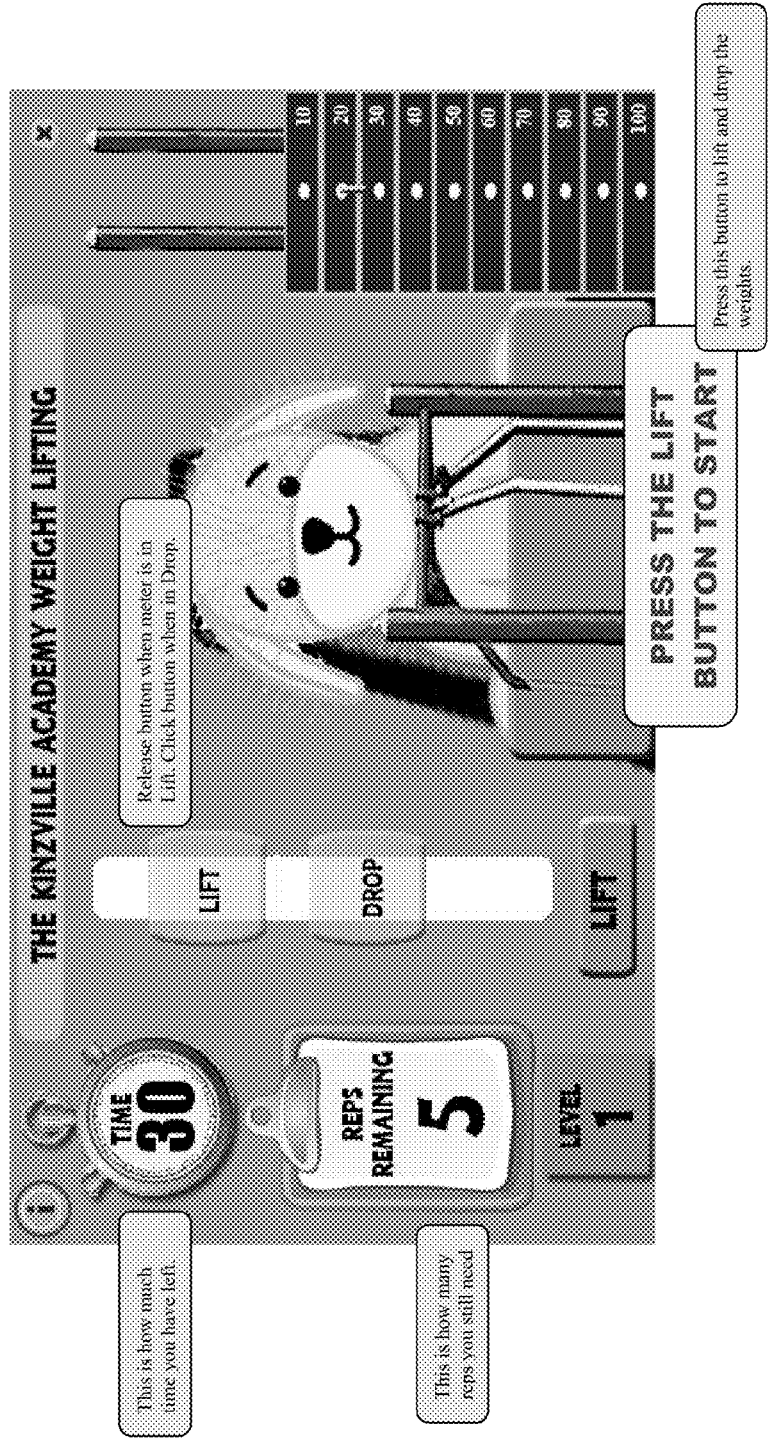
FIG. 23 is an exemplary user interface for a class or training activity in which a character can enroll in order to obtain a new or improve an existing strength attribute in accordance with an aspect of the subject application.

For strength (attribute) training, weight-lifting classes can be offered as illustrated in FIG. 23. Depending on the level of class, the character can be required to do one or more reps of a selected amount of weight within a set time frame. As in the other classes, the character is shown in position to perform the activity; and thus the activity is performed through the perspective of the character so it feels that the user is training their character rather than themselves. In addition, the character's facial expression can change during the activity according to how well or how poorly the character might be doing in the activity.

In order to get the character to do a "rep," a vertical power meter named is provided with a button interface below it—"LIFT" button. By clicking and holding down this "LIFT" button interface, the level in the power meter will begin to rise (along with the weight stack). However, the level (e.g., Level 1, 2, 3, etc.) of the activity determines a set of resistance and momentum values for the meter movement. Those values will determine how quickly the power bar increases, and how quickly it falls back down afterwards. In order to achieve one complete rep, the user must get their "LIFT" meter to BOTH peak (i.e.: change vertical direction from UP to DOWN) in the upper target range (the "LIFT" target) AND then stop in the lower target range (the "DROP" target) by clicking the button a second time.

Upon completion of a class, whether successful or not, the character is brought back to a superintendent's office (similar to the employment office), where an updated report card can be viewed and where additional information regarding the character's other classes for the day can be viewed. In addition, if the character has passed a level and has been advanced to a subsequent level, then the superintendent can notify the character at this time.

Turning now to FIGS. 24-28, there are demonstrated exemplary user interfaces that are associated with a grooming attribute. A character is tasked with grooming the customer's hair to match the customer's desired new hair style, cut, and/or color. Once again, a time limit is set, instructions are given and readily available for easy reference during the activity, and hints are available. Taking advantage of one or more hints may or may not affect the final score or grade-in this class or in any other class in which they are offered. For this class and in perhaps other classes, the character is allowed to ask a set number of questions to the customer and/or to the superintendent that might relate to the tools or supplies and how to use them.

Figure 24:
FIG. 24 is an exemplary user interface for a class or training activity in which a character can enroll in order to obtain a new or improve an existing grooming attribute in accordance with an aspect of the subject application.

FIG. 24 illustrates the customer's current look as well as their desired look. The desired look may not always be on-screen. However, the user can ask to see it a number of times based on the current class level. In some instances, the number of recall requests can result in some time taken off the timer (e.g., a time penalty) or in a reduction in score. For higher levels, no penalty is given. Classes associated with the grooming attribute may be relatively advanced. Thus, a tutorial session can be viewed before the activity begins. In addition, tool tips can be provided to describe the function or use of each tool. The desired look is selected at random or is selected based on the user's last grooming class or on the user's grooming class history. In the latter case, the cycle of desired looks may not repeat until the user has completed all desired looks at least once.

Figure 25:
FIG. 25 is an exemplary user interface for the class or training activity of FIG. 24, in which the character is enrolled and participating, in order to obtain a new or improve an existing grooming attribute in accordance with an aspect of the subject application.
Figure 26:
FIG. 26 is an exemplary user interface for the class or training activity continued from FIG. 25, in which the character is participating, in order to obtain a new or improve an existing grooming attribute in accordance with an aspect of the subject application.
Figure 27:
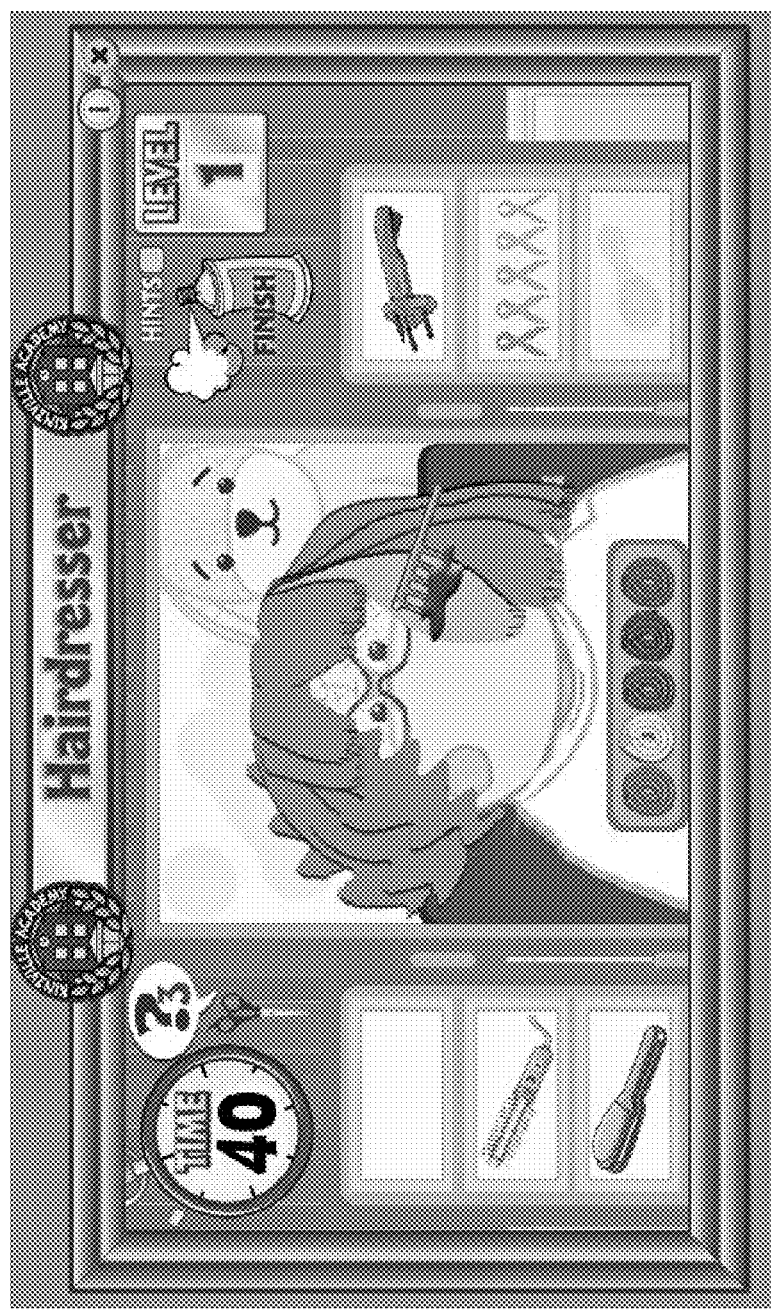
FIG. 27 is an exemplary user interface for the class or training activity continued from FIG. 26, in which the character is participating, in order to obtain a new or improve an existing grooming attribute in accordance with an aspect of the subject application.
Figure 28:
FIG. 28 is an exemplary user interface for the class or training activity continued from FIG. 27, in which the character is participating, in order to obtain a new or improve an existing grooming attribute in accordance with an aspect of the subject application.

Once the timer begins, the customer's hair is washed as shown in FIG. 25. To cut the hair, a user selects and highlights the portion to be cut and using the scissors tool, positions the target area where the cut is desired (FIG. 26). Hair coloring involves a color palette shown at the bottom of FIG. 27 as a series of five swirled objects, in which the user must select the correct color and then apply it using the color tool (shown in the hair with a "puddle of color" underneath). Again, color is applied to the highlighted portions of hair. Braiding, straightening, brushing, and/or curling is also shown as tools in FIG. 27. When the hairstyling is finished, the "finish" button can be selected, causing a plume of hair spray to cover the customer (FIG. 28). The customer's final look is revealed when the plume of hair spray disappears. The customer's satisfaction can determine whether the character passes the class. Alternatively, the final look can be scored or judged similar to the painting in the creativity-attribute class and if the end result is "close enough" to the desired look, then the character receives a "SUCCESS!" message or is given a score.

Other attributes, aside from those discussed above in the figures, and their associated classes or training sessions can also exist. In particular, a cooking attribute can also be made available for characters. Though not depicted in the figures, the cooking attribute can be trained or improved through various cooking related classes that involve math, counting, ordering, language, object recognition, matching, and the like. For example, in a series of "Griddle" classes, the character can take classes that involve preparing pancake stacks (e.g., 5 per stack) within a given amount of time. In addition, the character may be required to "cook" the pancakes without burning them or without taking them too soon (still raw) and then stack them accordingly. A color guide can be displayed to assist the character in determining when to remove the pancake. Success/or in this task can be determined according to the cooked pancakes (burned, raw, etc.) and according to the stacks (if the appropriate number of pancakes appear in each stack).

Other classes can involve matching a reference plate of breakfast foods using a variety of foods; preparing batter by mixing the proper amount of ingredients or by multiplying a recipe as instructed; as well as a many other tasks that involve griddle cooking. Further, other types of classes can be offered to train or improve a character's cooking attribute. For example, there can be baking classes, soup classes, outdoor grilling classes, beverage making classes, and the like.

As previously mentioned, characters who have acquired and improved their attributes and skills can participate in competitions that pitch their attributes against those of other characters. Attribute-specific competitions can focus on at least one attribute such as a cooking competition, for instance. Various other competitions can be created as well that are appropriate for other attributes. The competitions can take place in an arena-like setting for various prizes including but not limited to currency, trophies, actions (new moves that the character can make in the virtual environment), and the like. In addition, with each win or placement in a competition, the character's value or social status can improve within the virtual world.

These competitions can be purely character based, requiring little to no involvement of the user. Characters can be chosen for competitions based on a ticket or lottery system. The ticket system provides each character who wishes to compete with a variable number of tickets. The number of tickets can be based on the user's individual clicking speed to obtain the tickets. Alternatively or in addition, the number of tickets given can also be based on, for instance, the character's attributes, skills, or bonus points earned during classes. For example, if the competition is a cooking competition, the number of tickets given a character can depend on how many secret recipes the character holds-which can indicate how successful the character was in the cooking-related classes. Each competition may require a fee therefore some tools can be provided to help the user determine whether to enter the character into the competition. For instances, odds of winning and the other characters' statistics (performance report) can facilitate making this decision.

For users that have multiple characters, the fees may be reduced accordingly to encourage participation by all the characters. This is applicable to both classes and competitions. Once competitors are selected, a schedule can be posted for the day's competitions as well as for upcoming competitions. A user may be given the opportunity to withdraw their character from competition depending on when the competition is scheduled. However, a fee may be assessed in order to do so. For comprehensive tournaments comprised of several events or several stages of an event, a leader board can be displayed.

Characters that are not competing can have the opportunity to attend competitions. An admission fee may be charged. In some competitions, characters in the audience can participate in the judging for judged competitions. For example, at least a subset of the audience can be polled or asked to vote for their favorite model, outfit, car, art piece, or other object or ensemble that was prepared or presented from the competitors in the competition. Alternatively, at least a subset of characters in the audience can receive taste samples of food or meals prepared during the competition such as a cooking competition. The meal or food item would appear along with the character's other belongings or food items. Audience participation such as judging or eating can further encourage characters who are not competing to attend the competitions Moreover, acquiring and improving character attributes can further improve the character's health and happiness parameters. In addition, the character's overall social status and value can be elevated within the virtual world environment.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

What is claimed is:

1. An attribute building system for characters in a virtual environment comprising:
   a real-time monitoring component that receives a training request for a training session associated with at least one attribute and that determines whether a minimum real-time threshold value has elapsed since a previous training session in order to permit further processing of the training request, wherein the training request is submitted on behalf of a character and wherein the real-time monitoring component denies the training request when the minimum real-time threshold value has not elapsed since the previous training session and where the real-time monitoring component denies the training request by at least one of preventing participation in a competition that requires completion of said training request and not advancing to a subsequent level, wherein the real-time monitoring component determines upon receipt of the training request how many training sessions the user has participated in within a 24-hour period to determine whether the user has already participated in a permitted number of training sessions allowed within the 24-hour period, and wherein the training request is denied until the 24-hour period has elapsed by at least one of preventing participation in a competition that requires completion of said training request and not advancing to a subsequent level;

a training selection component that determines a level of training for the character based at least in part on a training history of the character, and that selects the training session from among multiple different possible training sessions, based at least in part on the character's training history, and wherein said training selection component presents the training session on-screen; and a performance indicator display that presents at least one of a grade, score and final result indication of the training session on-screen, wherein successful completion of the training session facilitates advancement to more difficult levels of training sessions for the at least one attribute and wherein the at least one attribute increases social status and value of the character in the virtual environment.

2. The system of claim 1 further comprising a request receiving component that receives an incoming training request and initially routes it to at least one of the real-time monitoring component and a health analysis component.

3. The system of claim 2, wherein the request receiving component initially routes the incoming training request to the real-time monitoring component and the health analysis component at substantially the same time to determine whether the training request satisfies the real-time threshold value and a health threshold value, respectively.

4. The system of claim 1, further comprising a health analysis component that evaluates a health status of a character to determine whether the character is able to participate in training, wherein the health analysis component determines that the character is permitted to participate in the training when the health status satisfies a minimum health threshold value.

5. The system of claim 4, wherein the health analysis component receives the training request from the real-time monitoring component when the minimum real-time threshold value is satisfied, wherein the minimum health threshold value and the minimum real-time threshold value must both be satisfied before the training request is further processed to permit the training session to proceed.

6. The system of claim 4, wherein the health analysis component receives the training request at the same time as the real-time monitoring component, wherein a minimum health threshold value and the minimum real-time threshold value must both be satisfied before the training request is further processed.

7. The system of claim 1, wherein the training session comprises at least one of a job, position, class, assignment, practice session, and exercise.

8. The system of claim 1, wherein the training request comprises at least one of an application for any one of a job, position, class, assignment, practice session, and exercise.

9. The system of claim 1, wherein the training request is denied when at least one of the health threshold value and the real-time monitoring component is not satisfied.

10. The system of claim 1, further comprising a profile data storage that stores health status information for one or more characters, wherein a health analysis component accesses the health status information corresponding to the character in real-time from the profile data storage.

11. The system of claim 1, wherein the at least one attribute comprises agility, intelligence, creativity, grooming, speed, style, and strength.

12. The system of claim 1, wherein the training session teaches or tests at least one of spatial recognition, memory recall, sequence recognition, object comparison, object identification, object matching, and color identification.

13. The system of claim 1, wherein the training selection component selects the training session from a determined level out of a range of levels of training sessions associated with the at least one attribute.

14. The system of claim 13 further comprising a performance analysis component that evaluates performance of the training session to determine whether the training session was successfully completed.

15. The system of claim 1, wherein the character is a virtual representation of a real product that is registered on a communication network, wherein such registration unlocks access to training sessions to obtain or improve attributes.

16. The system of claim 1, wherein the training history comprises at least one of a work history, a resume, and a report card.

17. An attribute building method for characters in a virtual environment comprising:

using a computer to receive a training request for a training session associated with at least one attribute, wherein the training request is submitted on behalf of a character, and determining whether a minimum real-time threshold value has been satisfied relative to previous training requests, in order to permit further processing of the training request, where said training request is not permitted to be further processed if said minimum real-time threshold value has not been satisfied relative to said previous training requests, where said training request is permitted to be further processed if said minimum real-time threshold value has been satisfied and where participation in a competition that requires completion of said training request is not allowed when said training request is not permitted to be further processed; evaluating a health status of a character using a health status component on the computer to determine whether a minimum health threshold value is satisfied in order to permit further processing of the training request, wherein the real-time monitoring component determines upon receipt of the training request how many training sessions the user has participated in within a 24-hour period to determine whether the user has already participated in a permitted number of training sessions allowed within the 24-hour period, and wherein the training request is denied until the 24-hour period has elapsed by at least one of preventing participation in a competition that requires completion of said training request and not advancing to a subsequent level;

when at least one of the minimum real-time threshold value and the health threshold value is satisfied, determining a level of training for the character based at least in part on the character's training history, selecting the training session based at least in part on the character's training history, and presenting the training session on-screen; and when the training session has ended, presenting at least one of a grade, score and final result of the training session on-screen, wherein successful completion of the training session facilitates advancement to more difficult levels of training sessions for the at least one attribute and wherein acquiring and improving the at least one attribute increases social status and value of the character in the virtual environment.

18. The method of claim 17 further comprising awarding additional actions or physical movements for the character which were previously unavailable to the character to facilitate expression, when at least one level is reached.

19. The method of claim 17 further comprising providing attribute-specific competitions that allow attribute-trained characters to compete against each other based in part on the one or more attributes trained thereon.

* * * * *